United States Patent
Suwabe

(10) Patent No.: US 8,095,791 B2
(45) Date of Patent: Jan. 10, 2012

(54) DISTRIBUTED PROCESSING SYSTEM, DISTRIBUTED PROCESSING METHOD AND IMAGE PROCESSING APPARATUS

(75) Inventor: Takeshi Suwabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 833 days.

(21) Appl. No.: 11/550,472

(22) Filed: Oct. 18, 2006

(65) Prior Publication Data

US 2007/0094458 A1 Apr. 26, 2007

(30) Foreign Application Priority Data

Oct. 26, 2005 (JP) .................. 2005-311809

(51) Int. Cl.
*G06F 15/16* (2006.01)
*G06F 13/00* (2006.01)

(52) U.S. Cl. ........ 713/166; 713/165; 713/167; 709/201; 709/202; 709/203; 711/100; 711/156; 711/161; 358/1.15; 358/1.16

(58) Field of Classification Search .................. 713/193, 713/165–167; 382/125; 710/1; 380/1.15, 380/1.16; 358/1.15, 1.16; 709/201–203; 711/100, 156, 161
See application file for complete search history.

(56) References Cited

U.S. PATENT DOCUMENTS

| | | | | |
|---|---|---|---|---|
| 5,333,164 A | * | 7/1994 | Tam | 378/8 |
| 6,374,336 B1 | * | 4/2002 | Peters et al. | 711/167 |
| 7,197,168 B2 | * | 3/2007 | Russo | 382/125 |
| 2001/0051967 A1 | * | 12/2001 | Jaber | 708/403 |
| 2002/0091734 A1 | * | 7/2002 | Redlich et al. | 707/511 |
| 2002/0163666 A1 | * | 11/2002 | Iwata et al. | 358/1.15 |
| 2003/0033543 A1 | * | 2/2003 | Hubbard et al. | 713/201 |
| 2003/0115282 A1 | * | 6/2003 | Rose | 709/214 |
| 2004/0268364 A1 | * | 12/2004 | Faraj | 719/316 |
| 2005/0160288 A1 | * | 7/2005 | Gerard | 713/200 |
| 2005/0165972 A1 | * | 7/2005 | Miyata et al. | 710/1 |
| 2005/0216754 A1 | * | 9/2005 | Ehud | 713/193 |

FOREIGN PATENT DOCUMENTS

| | | |
|---|---|---|
| GB | 2412760 | 10/2005 |
| JP | 2004-110318 | 4/2004 |
| JP | 2004-118239 | 4/2004 |
| JP | 2004110318 A * | 4/2004 |

* cited by examiner

*Primary Examiner* — Taghi Arani
*Assistant Examiner* — Madhuri Herzog
(74) *Attorney, Agent, or Firm* — Fitzpatrick, Cella, Harper & Scinto

(57) ABSTRACT

A distributed storage system implements high-speed data reconstitution processing while ensuring a high security level. Devices (63) in a device group (51) with security level "low" distributedly store fragmented data. When a process requesting device (60) belonging to a device group (50) with security level "high" instructs devices (62) belonging to the same group to reconstitute the data, the devices (62) collect and reconstitute part of the fragmented and stored data. After that, the process requesting device (60) collects the data partially reconstituted by the devices (62) and completely reconstitutes the data.

14 Claims, 31 Drawing Sheets

FIG. 19B

EXPRESSION 1 : · · · · · · · · · ·

EXPRESSION 2 : · · · · · · · · · ·

EXPRESSION 3 : · · · · · · · · · ·

EXPRESSION 4 : · · · · · · · · · ·

321

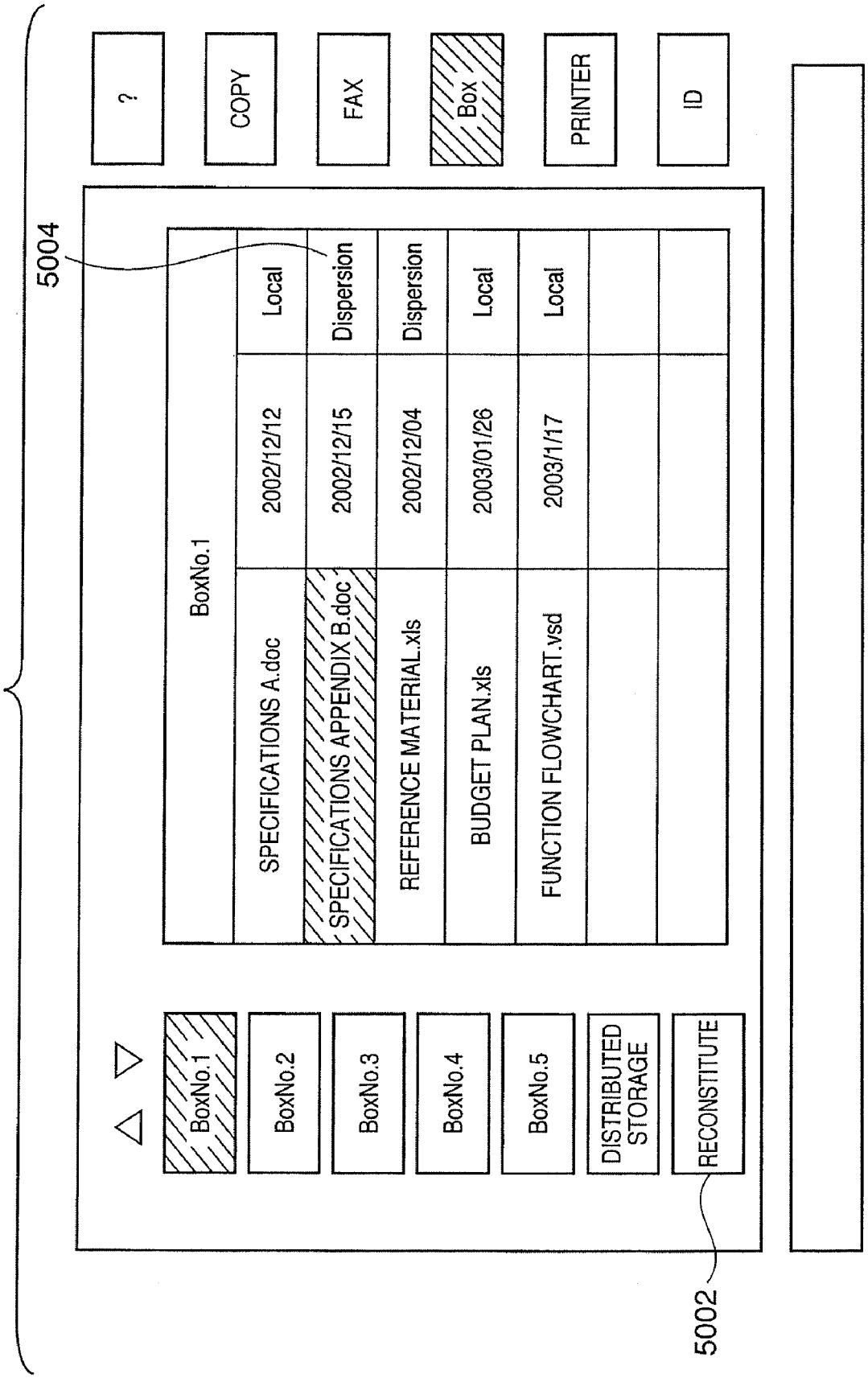

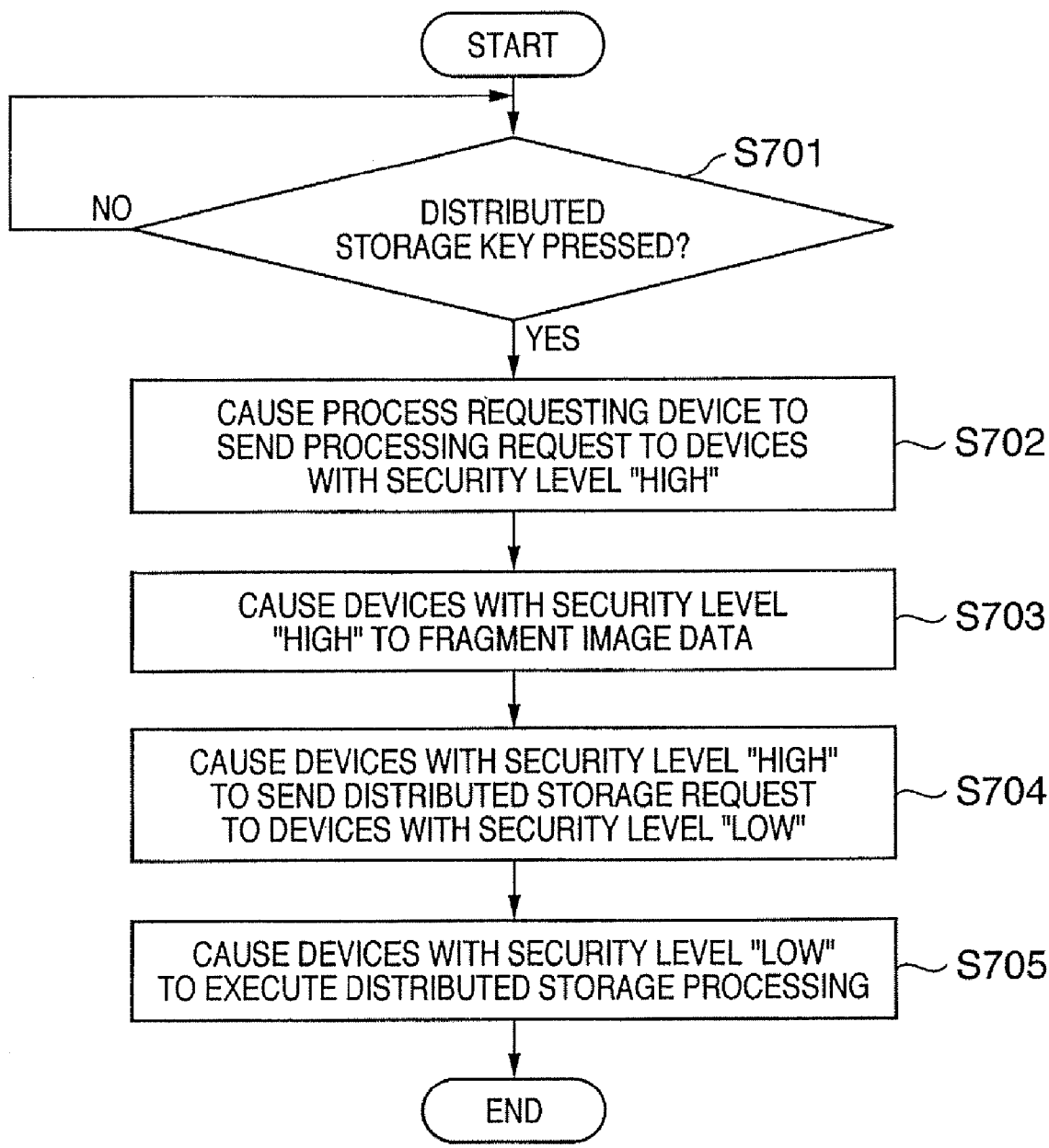

DISTRIBUTED PROCESSING SYSTEM, DISTRIBUTED PROCESSING METHOD AND IMAGE PROCESSING APPARATUS

BACKGROUND OF THE INVENTION

1. Field of the Invention

The present invention relates to a distributed processing system and distributed processing method which cause a plurality of devices to distributedly process data.

2. Description of the Related Art

Systems such as grid computing systems are known to improve the processing efficiency by distributed data processing. There is also proposed a technique of using such a distributed processing system to ensure the data security. A technique disclosed in, e.g., Japanese Patent Laid-Open No. 2004-118239 manages image data while retaining a high level of security by fragmenting image data to minimum units (bytes or words) and distributedly storing the image data in a plurality of digital copying machines connected through a network.

However, since the conventional distributed storage technique fragments image data into very small units such as bytes or words, image data reconstitution is time-consuming.

Additionally, even if the processing speed can be increased by causing a plurality of devices to execute large-scale image processing or arithmetic processing as distributed processing, it is impossible in terms of security to easily use a device unrecognized by the distributed processing requester.

SUMMARY OF THE INVENTION

The present invention has been made to solve the above-described problems separately or collectively, and has as its object to provide a distributed processing system and distributed processing method which implement high-speed distributed processing by a plurality of devices while ensuring a high level of security.

In order to achieve the above object, a distributed processing system according to the present invention comprises the following arrangement.

A distributed processing system which includes a plurality of device groups with different security levels, where object data is fragmented and the fragmented data are distributedly stored in devices in the device groups, wherein a first device in a first device group instructs at least two second devices in a second device group to reconstitute intermediate data constructing a part of the object data, each of the second device collects the fragmented data from devices in the system and reconstitutes intermediate data upon receiving the data reconstitution instruction from the first device, and the first device collects the intermediate data from each of the second devices and reconstitutes the object data.

A distributed processing system which includes a plurality of device groups with different security levels, wherein a first device in a first device group instructs at least two second devices in a second device group to execute data processing, the second device fragments the data processing upon receiving the data processing instruction, the second device instructs devices in the device groups to execute the fragmented data processing, the devices that have received the fragmented data processing instruction execute the fragmented data processing, the second device collects a fragmented data processing result from the devices, and the first device collects the data fragmented processing result collected by the second device.

A distributed processing system which includes a plurality of device groups with different security levels, wherein a first device in a first device group instructs at least two second devices in a second device group to store object data, the second device fragments the object data upon receiving the data storage instruction, the second device instructs devices in the device groups to store the fragmented data, and the devices that have received the instruction to store the fragmented data store the fragmented data.

In order to achieve the above object, a distributed processing method according to the present invention comprises the following arrangement.

A distributed processing method in a system which includes a plurality of device groups with different security levels, where object data is fragmented and the fragmented data are distributedly stored in devices in the device groups, comprising: a data reconstitution instruction step of causing a first device in a first device group to instruct at least two second devices in a second device group to reconstitute intermediate data constructing a part of the object data; an intermediate reconstitution step of causing each of the second device to collect the fragmented data from devices in the system and to reconstitute intermediate data upon receiving the instruction in the data reconstitution instruction step; and a complete reconstitution step of causing the first device to collect the intermediate data from each of the second devices and to reconstitute the object data.

A distributed processing method in a system which includes a plurality of device groups with different security levels, comprising: a data processing instruction step of causing a first device in a first device group to instruct at least two second devices in a second device group to execute data processing; a data processing fragmentation step of causing the second device to fragment the data processing upon receiving the instruction in the data processing instruction step; a partial processing instruction step of causing the second device to instruct devices in the device groups to execute the fragmented data processing fragmented in the data processing fragmentation step; a partial processing step of causing the devices that have received the fragmented data processing instruction in the partial processing instruction step to execute the fragmented data processing; an intermediate collection step of causing the second device to collect a fragmented data processing result in the partial processing step; and a complete collection step of causing the first device to collect the fragmented data processing result collected by the second device in the intermediate collection step.

A distributed processing method in a system which includes a plurality of device groups with different security levels, comprising: a data storage instruction step of causing a first device in a first device group to instruct at least two second devices in a second device group to store object data; a data fragmentation step of causing the second device to fragment the object data upon receiving the instruction in the data storage instruction step; a partial storage instruction step of causing the second device to instruct devices in the device groups to store the fragmented data fragmented in the data fragmentation step; and a partial storage step of causing the devices that have received the instruction to store the fragmented data in the partial storage instruction step to store the fragmented data.

A distributed processing method in a system which includes a plurality of device groups with different security levels, comprising: a first step of causing a device group with a first security level to process first fragmented data; a second step of causing a device group with a second security level higher than the first security level to process data which contains a plurality of first fragmented data and has a quantity larger than that of the first fragmented data; and an acquisition step of acquiring the data processed in the second step.

In order to achieve the above object, an image processing apparatus according to the present invention comprises the following arrangement.

An image processing apparatus which executes reconstitution processing, wherein the apparatus receives a reconstitution processing request from an external device, requests, in accordance with the request, a plurality of devices with a security level lower than that of the image processing apparatus to execute reconstitution processing, receives image data of a first data amount from the plurality of devices with the lower security level, and reconstitutes the image data of the first data amount into image data of a second data amount larger than the first data amount and transmits the image data of a second data amount to the external device.

An image processing apparatus, wherein the apparatus receives a distributed processing request from an external device, requests, in accordance with the request, a plurality of devices with a security level lower than that of the image processing apparatus to process an image data of a first data amount, receives processed image data of the first data amount from the plurality of devices with the lower security level, and generates image data of a second data amount larger than the first data amount from the processed image data of the first data amount and transmits the image data of a second data amount to the external device.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 19B is a view showing an example of data obtained by fragmenting the original data;

FIG. 24 is a view showing an example of a window that displays a distributed storage processing result; and FIG. 25 is a flowchart showing distributed storage processing according to the fourth embodiment.

DESCRIPTION OF THE EMBODIMENTS

Preferred embodiments of the present invention will now be described in detail in accordance with the accompanying drawings. Note that each arrangement in the following embodiments is merely an example, and the present invention is not limited to the illustrate arrangements.

First Embodiment (Security Group)

Figure 1:
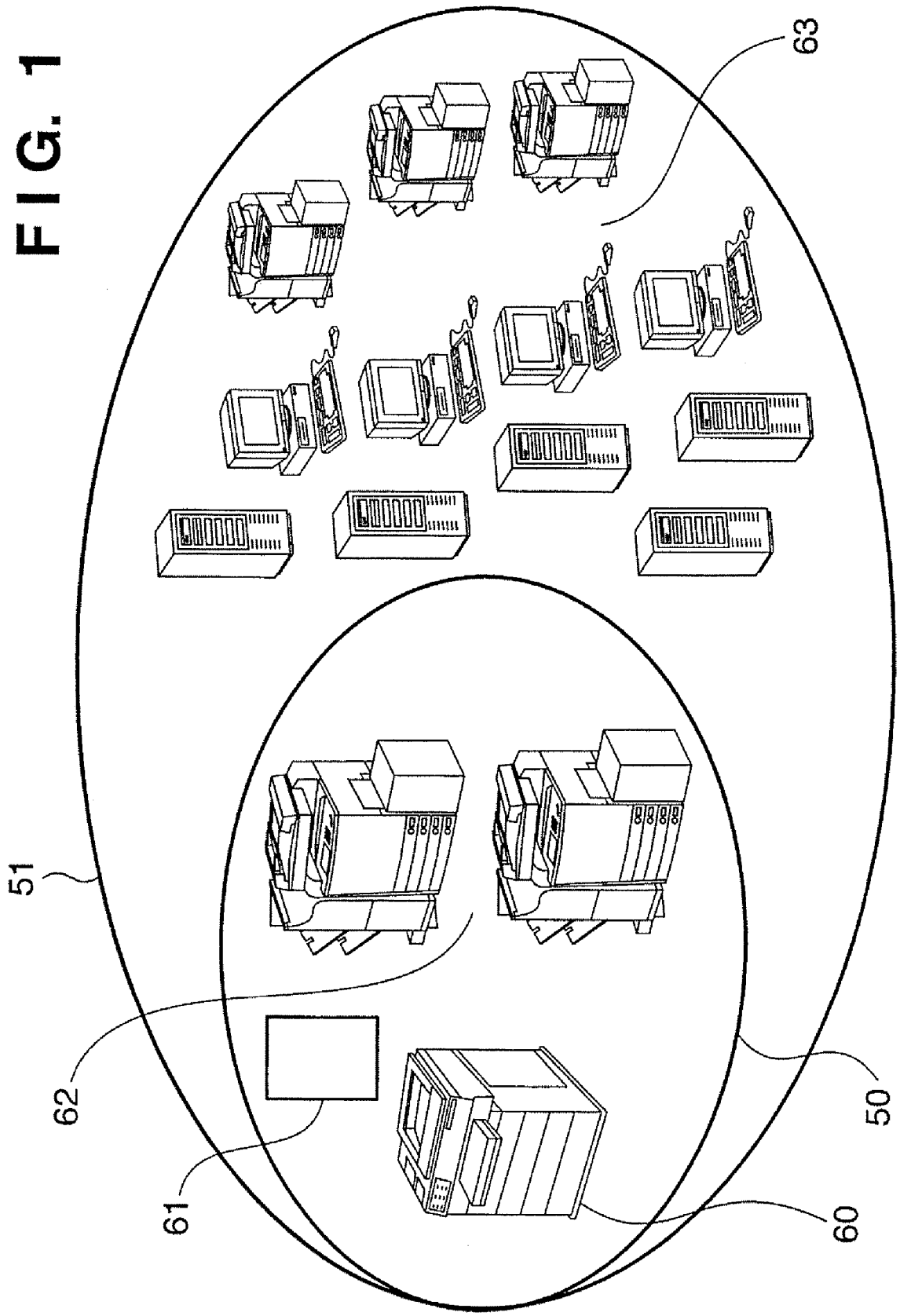
FIG. 1 is a view showing an example of a system environment according to an embodiment of the present invention.

FIG. 1 is a conceptual diagram showing an example of an environment where at least one device is categorized in each of a plurality of groups with different security levels. An example of such an environment is a network environment. Referring to FIG. 1, for example, a group 50 may be an intranet environment, and a group 51 may be an Internet environment. The group 50 may be a network environment used by, e.g., the personnel department in an intranet, and the group 51 is a network environment used by other departments. Alternatively, the group 50 may be an office environment in an intranet, and the group 51 may be a laboratory environment. Such grouping can freely be done in accordance with the security level. The group 51 may be set as devices registered in the grid computing network of an Internet environment. The grid computing will be described later.

This embodiment will be described by exemplifying grouping to define that the group 50 is an office environment in an intranet, and the group 51 is a laboratory environment.

A process requesting device 60 (e.g., copying machine) and devices 62 with security level "high" are categorized in the group 50. Copying machines are installed as the process requesting device 60 and devices 62. Image data 61 is the original data of distributedly stored data (to be described later). Devices 63 with security level "low" are categorized in the group 51. Copying machines, PCs, servers, and the like are installed as the devices 63.

The installation location of a device, i.e., the office environment (e.g., the first floor of a building) or laboratory environment (e.g., the second floor of a building) decides the security level "high" or "low". In this embodiment, the security level is irrelevant to the arrangement (function) of a device. The security levels are thus set because, for example, only full-time workers are accessible to the office environment, and the laboratory environment accepts even externally stationed employees. That is, the category of a user accessible to a device decides the security level of the device.

(Arrangement of Device)

Arrangement of Copying Machine

Figure 2:
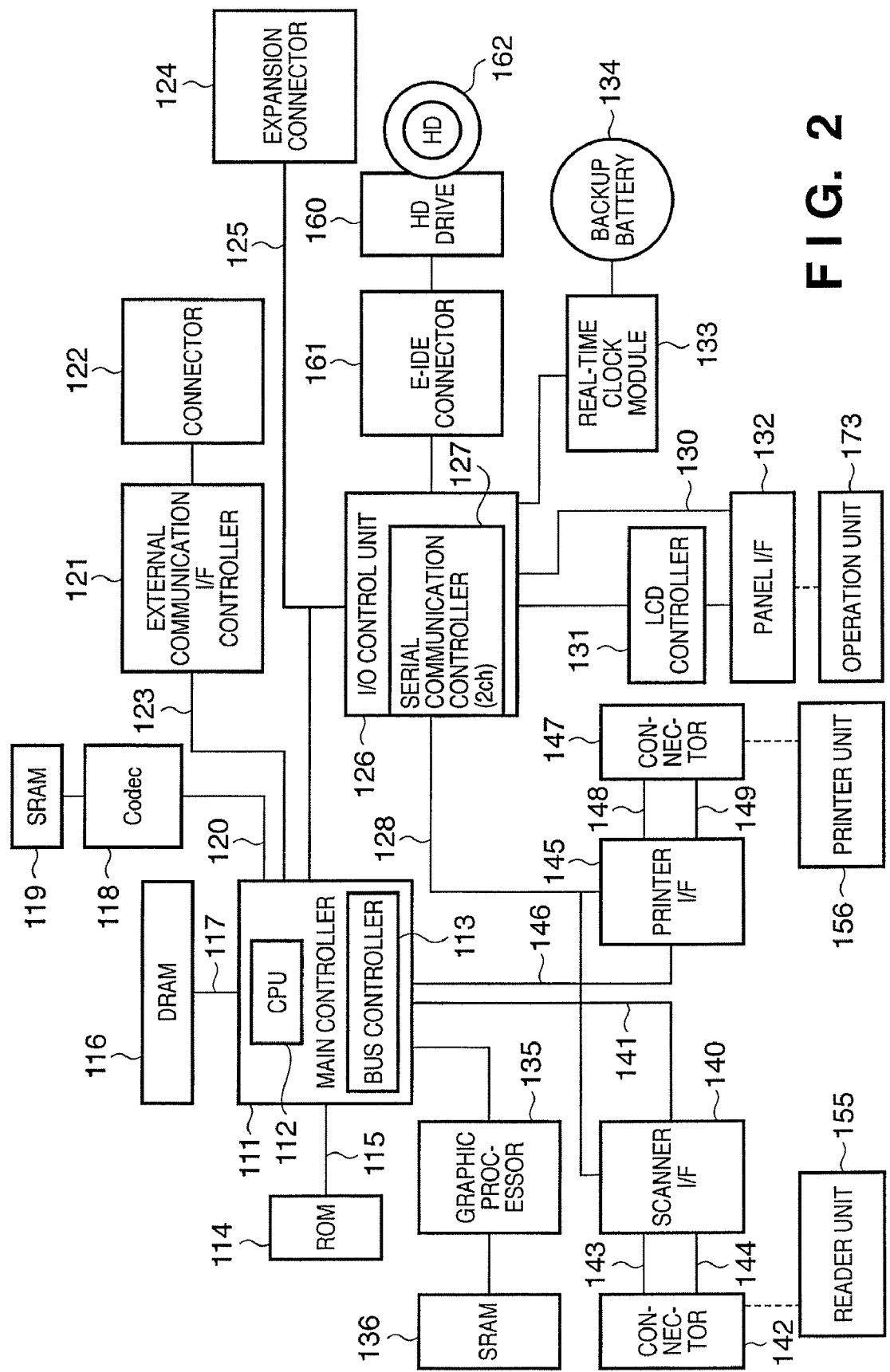
FIG. 2 is a block diagram showing the hardware configuration of a copying machine.

FIG. 2 is a block diagram showing the hardware configuration of a copying machine in the arrangement shown in FIG. 1.

A main controller 111 mainly includes a CPU 112, bus controller 113, and various kinds of I/F controllers.

The CPU 112 and bus controller 113 control the operation of the copying machine. The CPU 112 operates on the basis of a program loaded from a ROM 114 through a ROM I/F 115. An operation of interpreting PDL (Page Description Language) code data received from the host computer and rasterizing it into raster image data is also described in this program and processed by software. The bus controller 113 controls transfer of data input/output from each I/F to do arbitration in case of bus conflict or control DMA data transfer.

A DRAM 116 connects to the main controller 111 through a DRAM I/F 117 and serves as a work area for the operation of the CPU 112 or an area to store image data.

A Codec 118 compresses raster image data stored in the DRAM 116 by MH, MR, MMR, JBIG, or JPEG and also decompresses compressed and stored code data to raster image data. An SRAM 119 serves as a temporary work area of the Codec 118. The Codec 118 connects to the main controller 111 through an I/F 120. The bus controller 113 controls DMA data transfer between the Codec 118 and the DRAM 116.

A graphic processor 135 executes processing such as image rotation, scaling, and color space conversion.

An external communication I/F controller 121 connects to the main controller 111 and to an external network through a connector 122.

A general-purpose high-speed bus 125 connects to an I/O control unit 126 and an expansion connector 124 to connect an expansion board. A PCI bus is generally available as the general-purpose high-speed bus 125.

The I/O control unit 126 has a 2-channel start-stop synchronization serial communication controller 127 to transmit/receive a control command to/from the CPUs of a reader unit 155 and printer unit 156. The serial communication controller 127 connects to external I/F circuits (scanner I/F 140 and printer I/F 145) through an I/O bus 128.

A panel I/F 132 includes an I/F connected to an LCD controller 131 to do display on the liquid crystal screen on an operation unit 173, and a key input I/F 130 to perform inputs from hard keys and touch panel keys.

The operation unit 173 has a liquid crystal display unit, a touch panel bonded to the liquid crystal display unit, and a plurality of hard keys. A signal input from the touch panel or hard key is sent to the CPU 112 through the panel I/F 132. The liquid crystal display unit displays image data received from the panel I/F 132. The liquid crystal display unit displays image data and functions in the operation of the image processing apparatus.

A real-time clock module 133 updates and saves the date and time managed in the device. A backup battery 134 backs up the real-time clock module 133.

An E-IDE connector 161 connects an external storage device. In this embodiment, the E-IDE connector 161 connects a hard disk drive 160 to store or read out image data in or from the hard disk 162.

Connectors 142 and 147 connected to the reader unit 155 and printer unit 156 include start-stop synchronization serial I/Fs 143 and 148 and video I/Fs 144 and 149, respectively.

The scanner I/F 140 connects to the reader unit 155 through the connector 142 and to the main controller 111 through a scanner bus 141. The scanner I/F 140 has a function of executing predetermined processing for an image received from the reader unit 155. The scanner I/F 140 also has a function of outputting, to the scanner bus 141, a control signal generated on the basis of a video control signal received from the reader unit 155. The bus controller 113 controls data transfer from the scanner bus 141 to the DRAM 116.

The printer I/F 145 connects to the printer unit 156 through the connector 147 and to the main controller 111 through a printer bus 146. The printer I/F 145 has a function of executing predetermined processing for image data received from the main controller 111 and outputting the data to the printer unit 156. The printer I/F 145 also has a function of outputting, to the printer bus 146, a control signal generated on the basis of a video control signal received from the printer unit 156. The bus controller 113 controls transfer of raster image data rasterized on the DRAM 116 to the printer unit 156. Raster image data is DMA-transferred to the printer unit 156 through the printer bus 146 and video I/F 149.

(Arrangement of Control Device)

Figure 3:
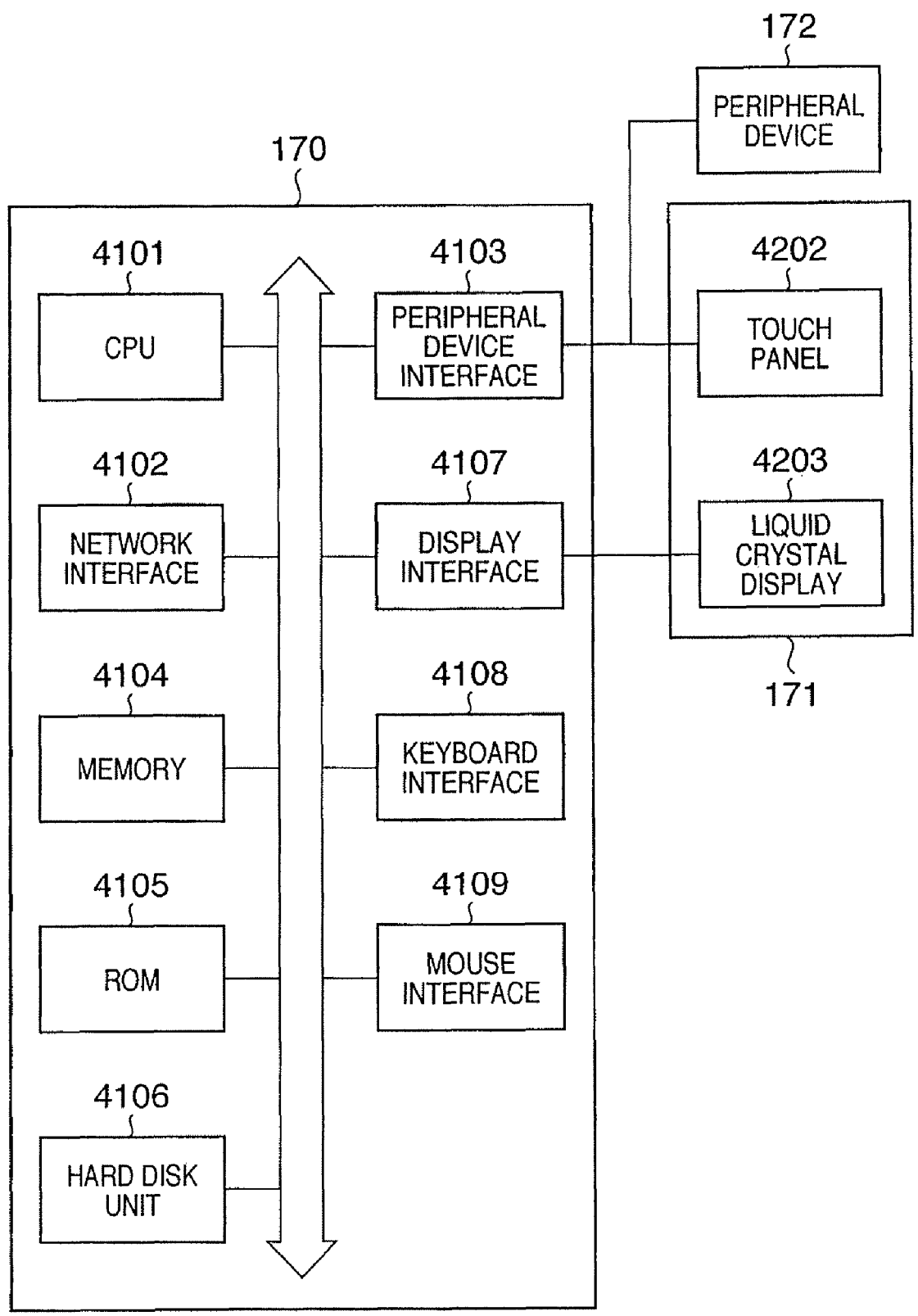
FIG. 3 is a block diagram showing the hardware configuration of a PC or server.

FIG. 3 is a block diagram showing the hardware configuration of a control apparatus used as a PC or server in the arrangement shown in FIG. 1.

Reference numeral 170 denotes a control apparatus main body. A main CPU 4101 in the control apparatus 170 is a central processing unit which controls the entire apparatus by executing programs stored in a ROM 4105 and hard disk unit 4106. A network interface 4102 is a control unit for data communication with another device through a network. Software executed by the CPU 4101 can bidirectionally transmit/receive data to/from a printing device, another network device, or another computer through a LAN.

A memory 4104 is generally a volatile storage unit to save data and instructions to be executed by the CPU 4101. The ROM 4105 is a read-only storage unit to save programs and data for fundamental hardware control. The hard disk unit 4106 is generally a nonvolatile storage unit to save programs to be executed by the control apparatus main body 170 or calculated data. The hard disk unit 4106 stores a boot program (starter program: a program to start execution (operation) of hardware or software), a plurality of applications, edited files, user files, and a network management program.

A peripheral device interface 4103 is a control unit to connect a peripheral device 172 having an interface such as a USB, RS-232C, or IEEE1394. Examples of the peripheral device 172 are a mouse, a keyboard, an external storage device such as a CD-ROM drive or memory media drive, and a user authentication device to specify a user.

A display interface 4107 is a control unit to connect a display unit to display an internal state or execution state. A keyboard interface 4108 or mouse interface 4109 can connect input devices to make the user input data and instructions to the control apparatus 170.

An operation unit 171 comprises a liquid crystal display 4203 which sometimes has a sheet-shaped transparent touch panel 4202 on its surface. The touch panel 4202 serves as a pointing device like a mouse. Software executed by the CPU 4101 can detect, as coordinate data, a position on the display pointed by the user using a mouse or touch panel 4202. The peripheral device interface 4103 drives the touch panel 4202. The liquid crystal display 4203 is a display unit to display an internal state or execution state of the control apparatus 170. Software executed by the CPU 4101 can draw a graphical user interface on the liquid crystal display 4203. The display interface 4107 drives the liquid crystal display 4203.

(General Grid Computing)

General grid computing will be described below with reference to FIGS. 4 and 5.

Figure 4:
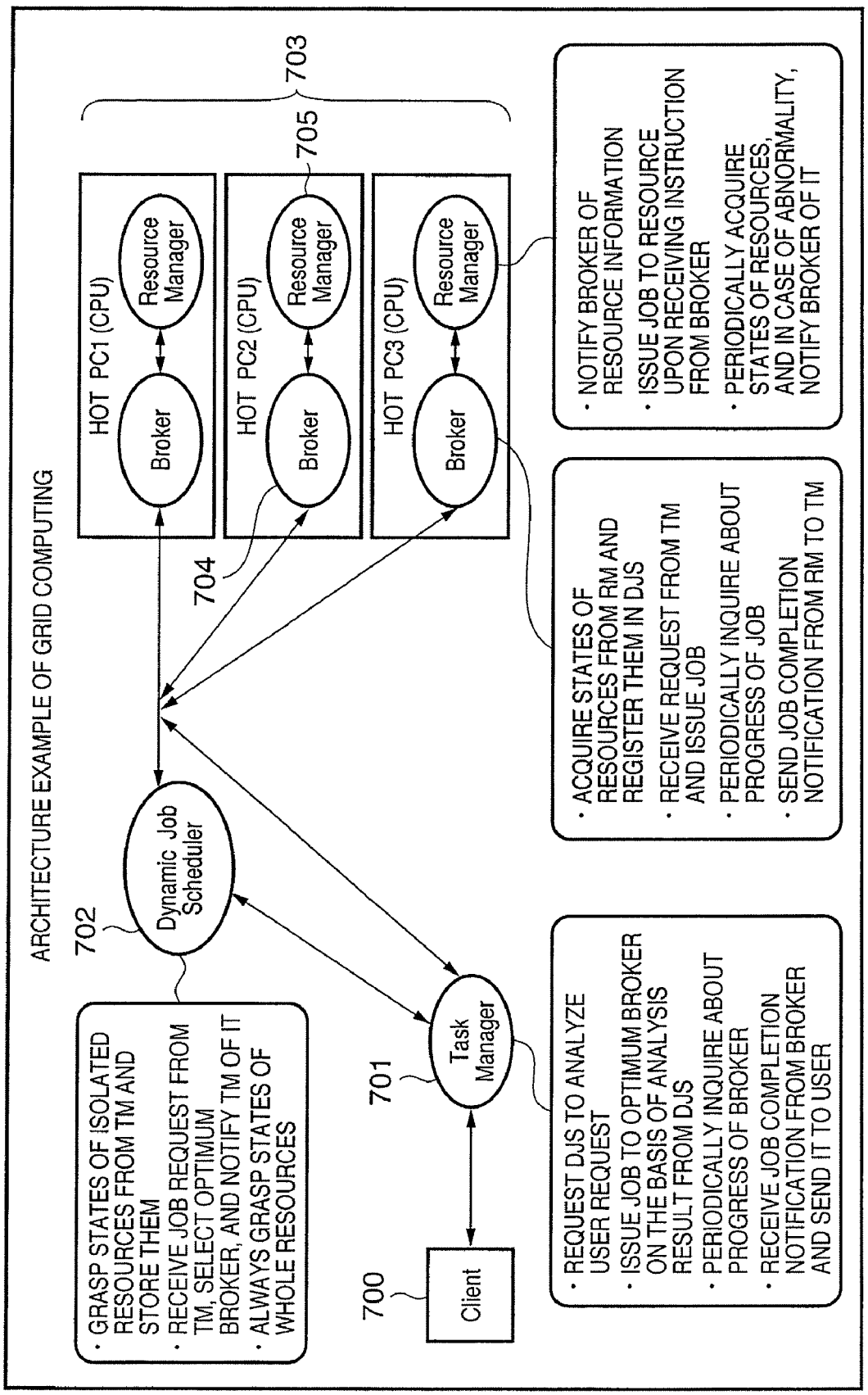
FIG. 4 is a conceptual diagram for explaining general grid computing.

FIG. 4 is a conceptual diagram showing grid computing generally called desktop grid that executes a job by using the idle time of the CPU of, e.g., a desktop PC.

A Client 700 is a user who issues a job. A request (job) from the Client 700 is transferred to a Task Manager (to be abbreviated as TM hereinafter) 701. The contents of the job are transmitted to a Dynamic Job Scheduler (to be abbreviated as DJS hereinafter) 702.

The DJS 702 manages the resources of a whole host PC group 703. The DJS 702 selects a Broker 704 of an optimum resource and notifies the TM 701 of it. A resource here indicates the idle state of a CPU.

The Broker 704 registers, in the DJS 702, information of resources acquired by a resource manager (to be abbreviated as RM hereinafter) 705, receives a job in accordance with the request from the TM 701, and notifies the TM 701 of completion of the job.

The TM 701 issues a job to the optimum Broker 704 selected by the DJS 702 and monitors the progress of the job. Upon receiving a completion notification from the Broker 704, the TM 701 notifies the user of the result. In case of, e.g., a failure or upon receiving another job, i.e., upon detecting a change or abnormality of the resource, the RM 705 notifies the Broker 704 of it.

This mechanism distributes a job to a resource such as an optimum (normally, idle) CPU to enable distributed processing, thereby implementing desktop grid computing.

Figure 5:
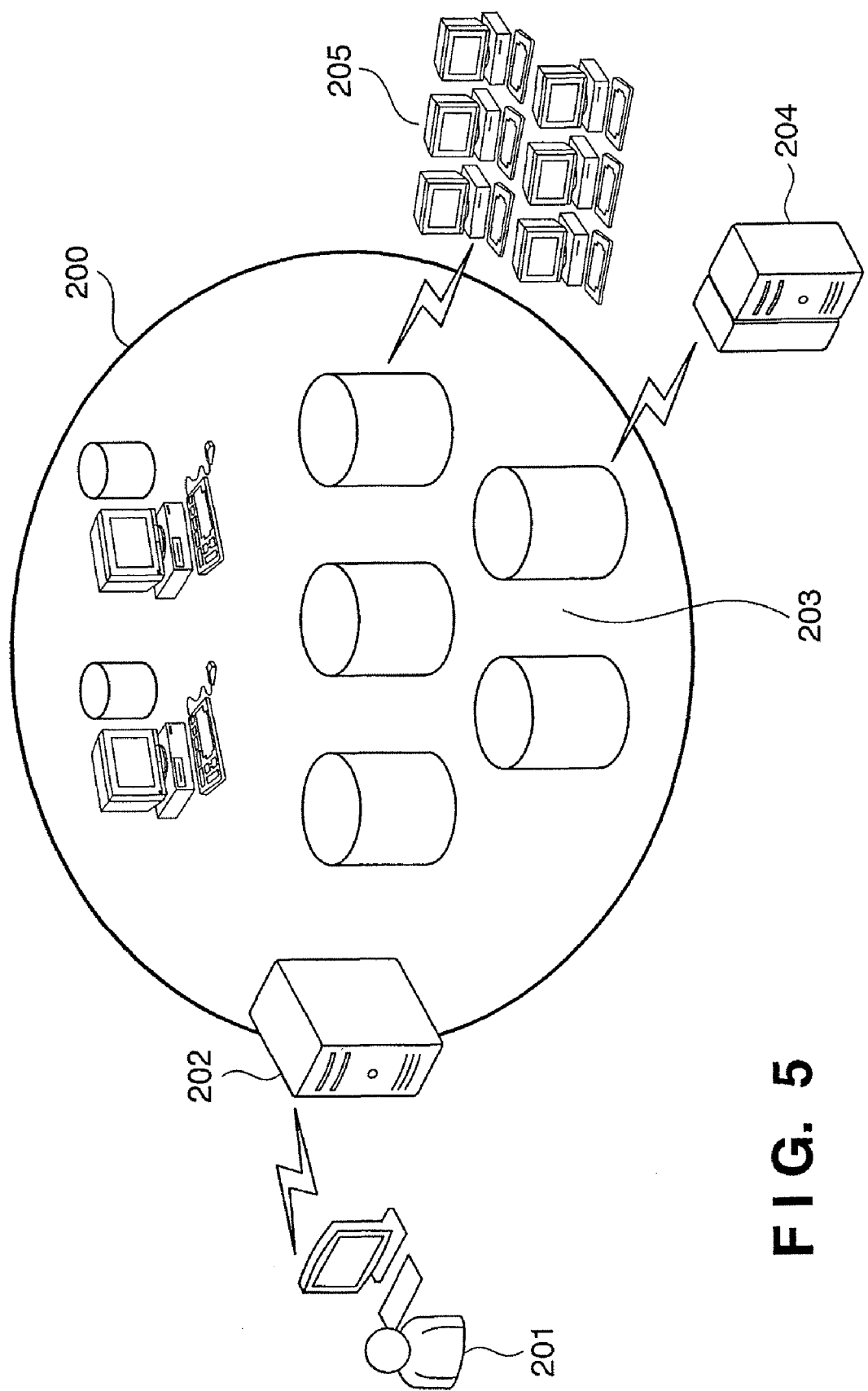
FIG. 5 is a conceptual diagram for explaining general grid computing.

FIG. 5 is a conceptual diagram showing grid computing generally called data grid that distributedly stores and manages data by using a free space of storage areas of various databases or the HDDs of private PCs.

A user 201 can refer to data on various databases and private PCs 203 in a background environment 200 (managed by a data grid portal) in real time only by accessing a data grid portal 202 serving as a portal. In the data grid, the user can also cooperate with a simulation engine 204 to refer to data in it or cooperate with another grid network 205 to refer to data in it. This embodiment applies this data grid.

(Outline of Grid Computing of This Embodiment)

Grid computing according to this embodiment will be explained below with reference to FIGS. 6A to 6C.

Figure 6A:
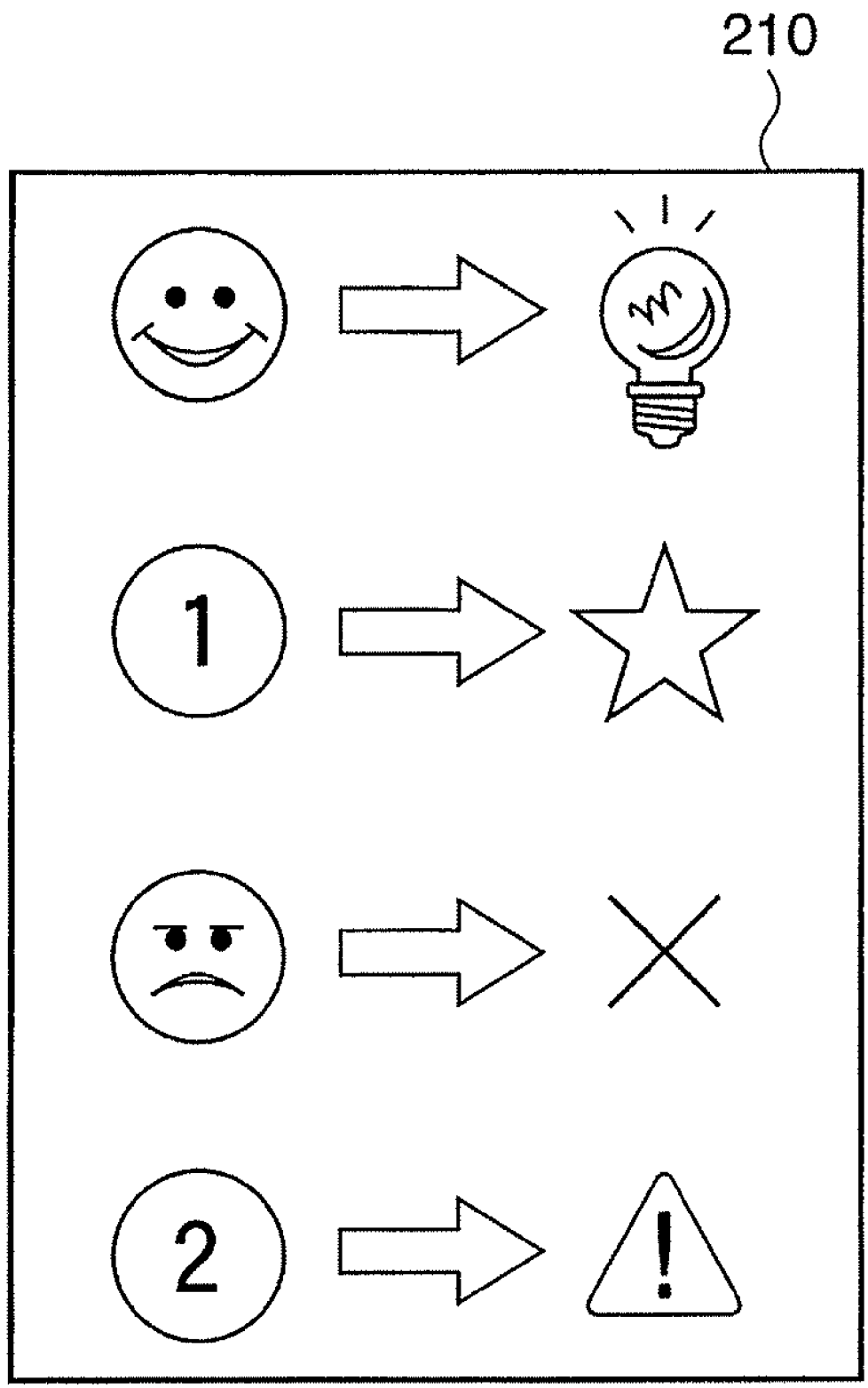
FIG. 6A is a view showing an example of original data as a processing target.
Figure 6B:
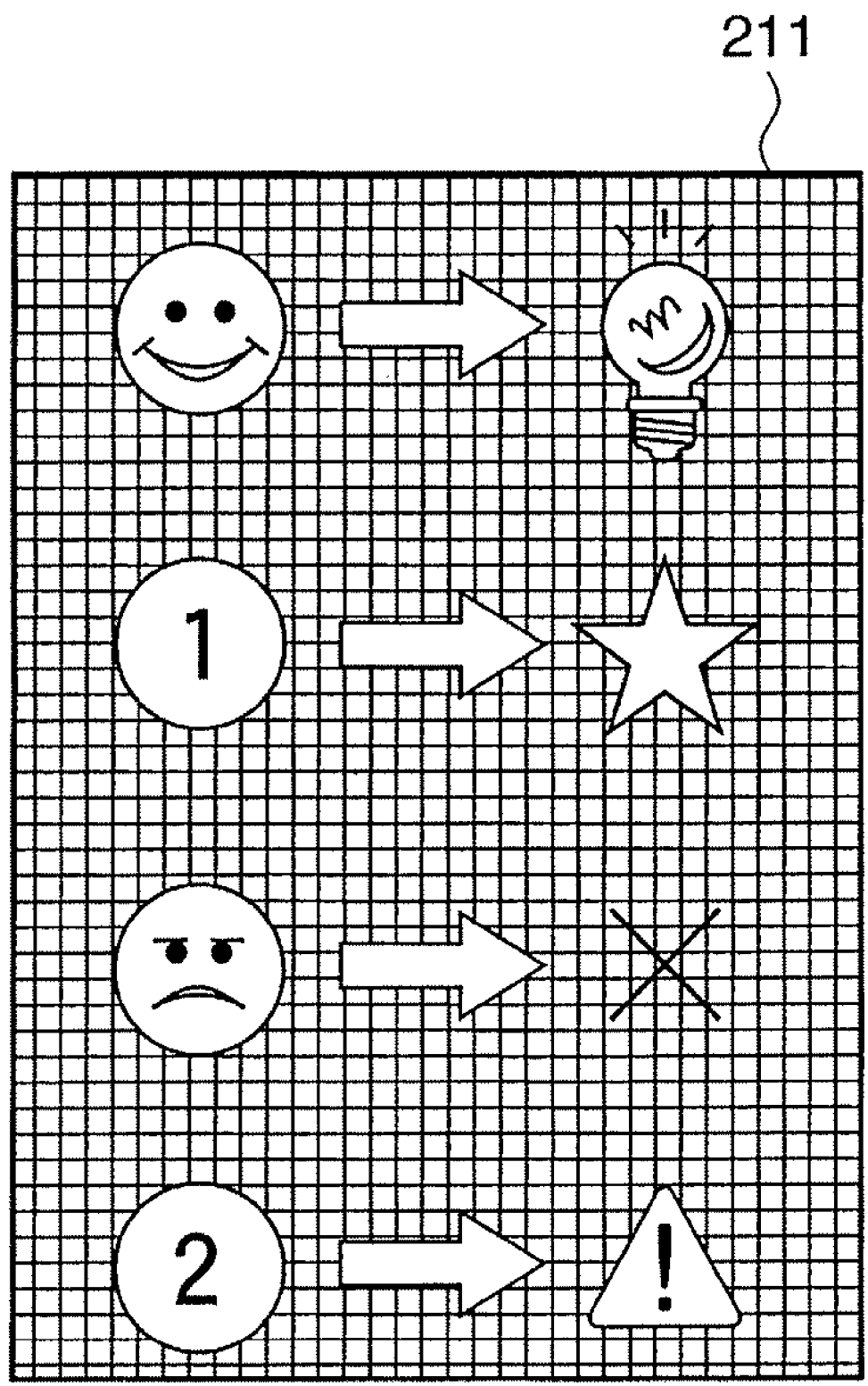
FIG. 6B is a view showing an example of data obtained by fragmenting the original data.
Figure 6C:
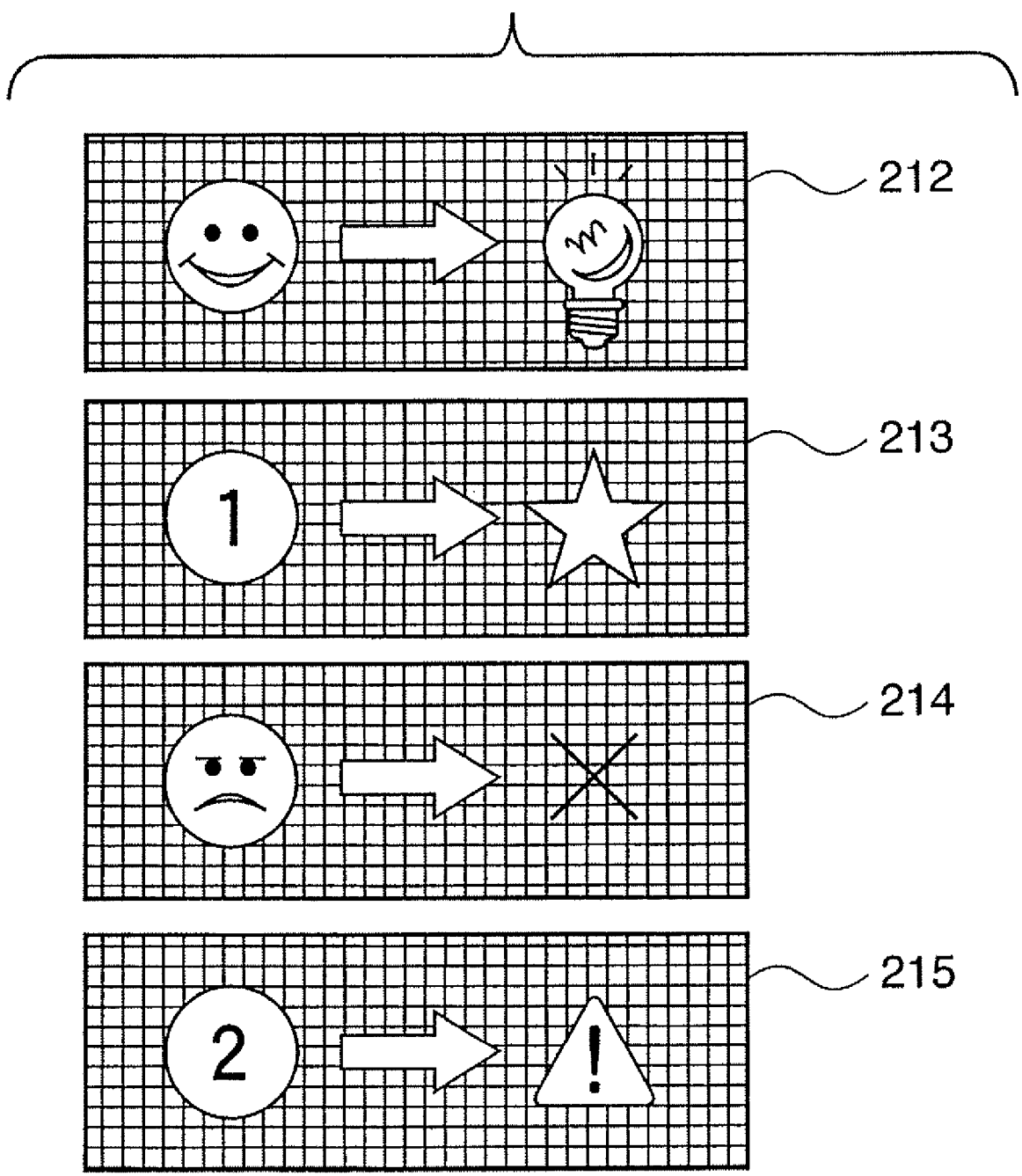
FIG. 6C is a view showing an example of data obtained by temporarily collecting the fragmented data.

FIGS. 6A to 6C show an application example of the data grid described in FIG. 5 so as to explain image data stored in each device shown in FIG. 1.

Image data 210 in FIG. 6A is an example of the image data 61 in FIG. 1 containing several objects. That is, the image data 210 indicates the significances of the objects, like a ciphertext.

Image data 211 in FIG. 6B represents that the image data 210 shown in FIG. 6A is fragmented and stored in the devices 63 with security level "low" in FIG. 1. As is apparent from FIG. 6B, the image data 210 is fragmented into very small units. In this embodiment, the original image data 210 is made unrecognizable by distributedly storing the cells shown in FIG. 6B in the devices 63 at random. That is, it is impossible to recognize the original image data 210 as image data like a ciphertext. The fragment unit of the image data 210 is not particularly limited and may be, e.g., byte or word.

FIG. 6C shows a state wherein the data is partially reconstituted (to be referred to as partial reconstitution hereinafter) upon receiving, from the process requesting device 60 in FIG. 1, an instruction to reconstitute the image data 210 distributedly stored in the devices 63. Image data 212 to 215 are partially reconstituted to a level that makes the contents of the image data recognizable at this time. That is, it is partially recognizable that the original image data 210 is like a ciphertext. The partial reconstitution of data to the recognizable level is required to be done by the devices 62 with security level "high" which are categorized to the office environment. At this time, the process requesting device 60 may execute processing of completely reconstituting the data (to be referred to as complete reconstitution hereinafter) in addition to the partial reconstitution. However, since this poses a problem of performance, it is more effective to cause the devices 62 with security level "high" to execute only the partial reconstitution processing. Hence, after the devices 62 with security level "high" execute partial reconstitution, the process requesting device 60 executes complete reconstitution.

(Basic Window)

Figure 7:
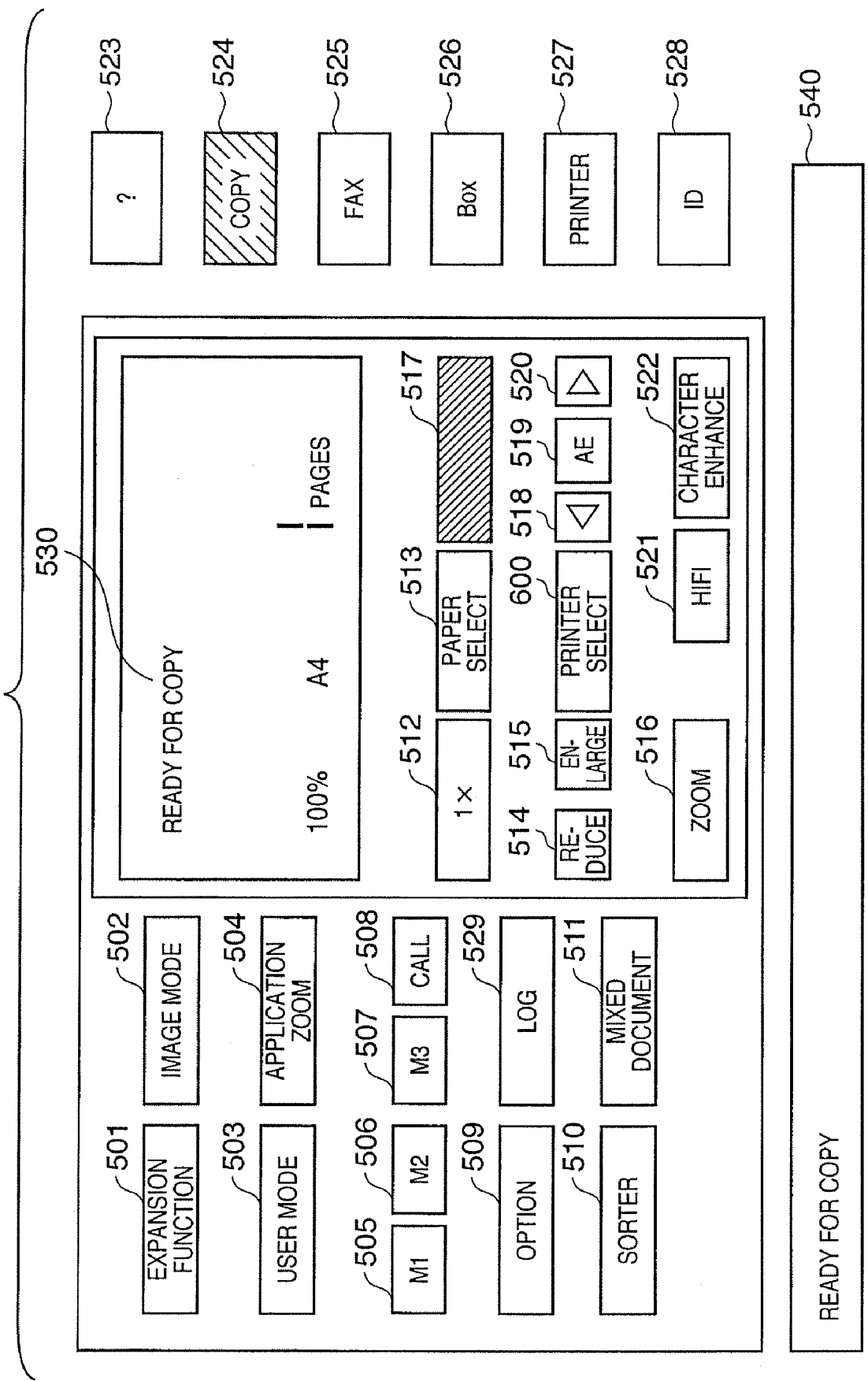
FIG. 7 is a view showing an example of a basic window displayed on the operation unit of the copying machine.

FIG. 7 is a view showing an example of a basic window displayed on the operation unit 173 of the copying machine shown in FIG. 2. As described above, the operation unit 173 has a touch panel. When the user touches the area inside the frame of a function displayed on the touch panel, the function is executed.

Referring to FIG. 7, the user presses a copy mode key 524 to perform the copy operation. When the user presses the copy mode key 524, the operation unit 173 displays a copy mode window 530.

A status line 540 displays a message representing a device state or print information. In the example shown in FIG. 7, the status line 540 indicates a copy standby state.

Pressing an expansion function key 501 sets, e.g., a double-sided copy mode, multiple copy mode, move mode, binding margin setting mode, or frame removal mode. Pressing an image mode key 502 sets a mode to do shading, shadowing, trimming, or masking for a copy image. With a user mode key 503, the user can register a mode memory and set a standard mode window. An application zoom key 504 sets a mode to independently scale a document in the X and Y directions or a zoom program mode to calculate the scaling factor on the basis of the document size and copy size.

The user presses an M1 key 505, M2 key 506, and M3 key 507 to invoke mode memories registered in these keys. A call key 508 calls and sets items that are set immediately before.

An option key 509 sets an optional function such as a film projector for direct copy from a film. A sorter key 510 sets sorting, non-sort, or grouping. The user presses a mixed document key 511 when setting documents with A4 and A3 sizes or B5 and B4 sizes together on the document feeder. A log key 529 displays the log information of printed jobs. For, e.g., a print job, information containing the job end time, user name, file name, and the number of pages is displayed.

A 1× key 512 sets the copy scaling factor to 100%. A reduce key 514 or enlarge key 515 reduces or enlarges a standard size. A paper select key 513 selects copy paper. A printer select key 600 selects a receiving-side copying machine in a remote copy mode or networked copy mode. Density keys 518 and 520 adjust the copy density. The copy density increases for each press of the key 518 and decreases for each press of the key 520. A density indicator 517 indicates the current copy density. The indicator extends and contracts horizontally as the density keys 518 and 520 are pressed.

An AE key 519 allows to automatically adjust the density of a document such as a newspaper with a dark background. A HiFi key 521 allows to copy a document such as a photo document with a high-level halftone. A character enhance key 522 allows to enhance characters in copying a text document.

When the user does not know the function of a key, he/she presses a guide key 523 to display the explanation of the key. A fax key 525 enables transmission of a document. A Box key 526 displays a Box function. When the user presses the Box key 526, an operation window of distributedly stored image data as a characteristic feature of this embodiment is displayed. This will be described later in detail. The user presses a printer key 527 to change the print density of a receiving-side copying machine in, e.g., a remote copy mode or refer to detailed print output information of PDL data from a remote host computer. An ID key 528 is necessary for the user to log in or change the login user.

(Operation Window of Distributedly Stored Data)

Figure 8:
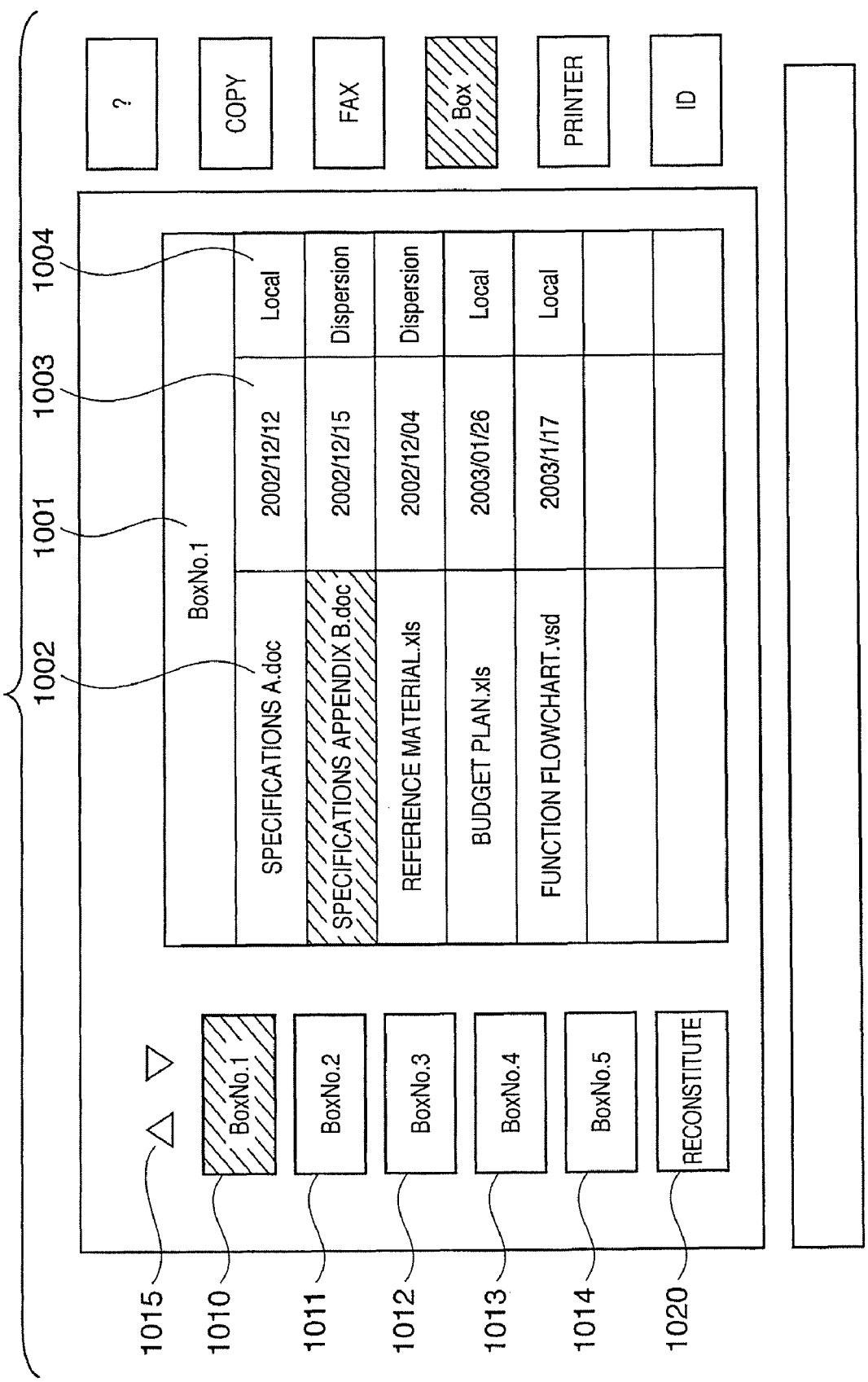
FIG. 8 is a view showing an example of a window displayed when a Box key is pressed.

FIG. 8 is a view showing an example of a window displayed when the Box key 526 in FIG. 7 is pressed. A field 1001 displays a Box number. A field 1002 displays image data names. A field 1003 displays image data saving dates. A field 1004 displays information representing image data storage locations, i.e., whether image data is saved in the local disk (hard disk 162 in FIG. 2) or distributedly saved. "Local" is displayed for image data saved in the local disk, and "Dispersion" is displayed for distributedly stored image data.

Buttons 1010 to 1014 with Box numbers allow to browse the contents of a selected Box. Scroll buttons 1015 move indication on one of the buttons 1010 to 1014 to another consecutive Box number. A reconstitute key 1020 instructs to reconstitute image data with "Dispersion" in the field 1004. Pressing the reconstitute key 1020 displays a window shown in FIG. 9.

Figure 9:
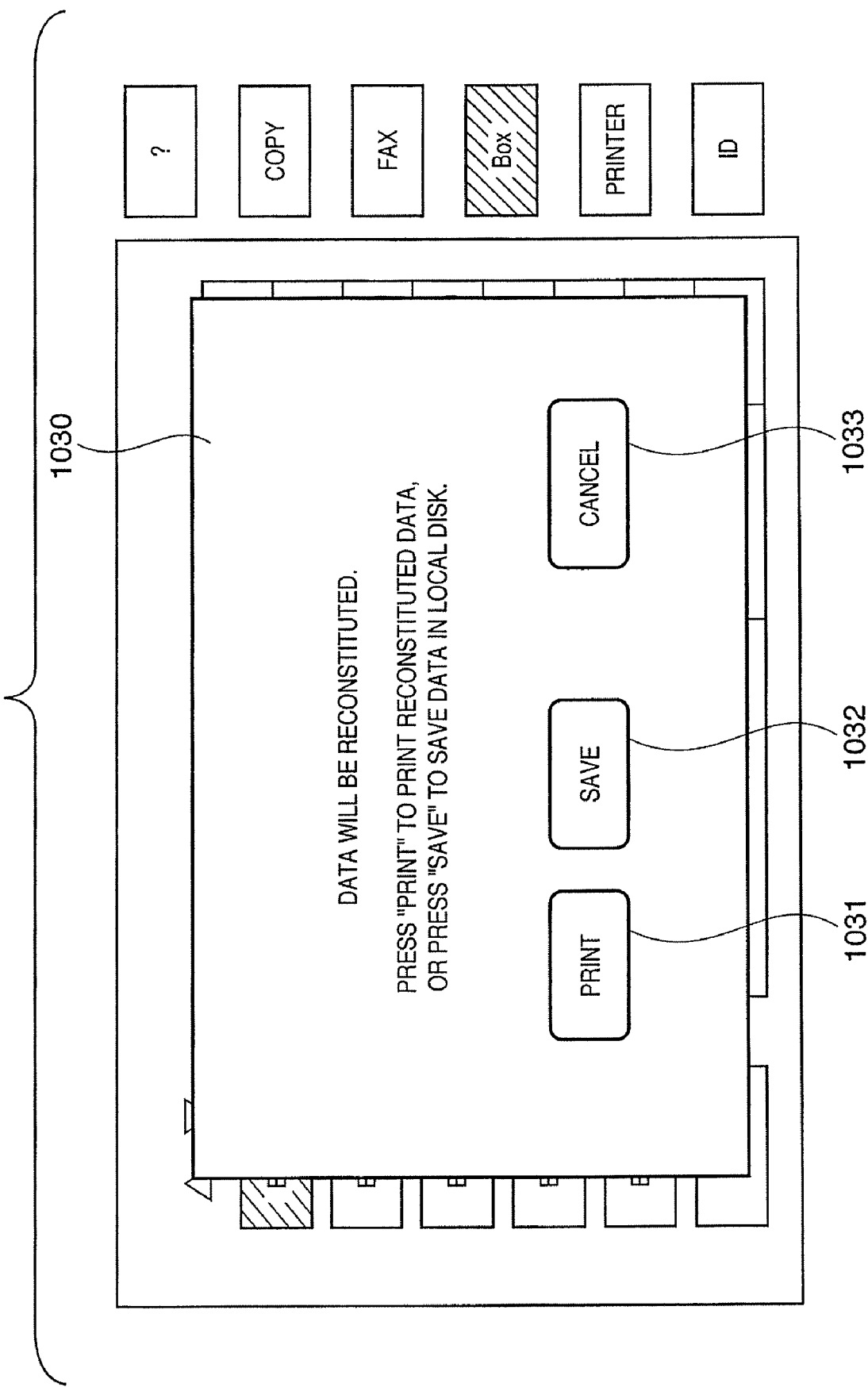
FIG. 9 is a view showing an example of a window displayed when a reconstitute key is pressed.

FIG. 9 is a view showing an example of display on the operation unit 173 when the reconstitute key 1020 in FIG. 8 is pressed. Display 1030 promotes the user to select print or save of reconstituted image data. Upon pressing a print key 1031, reconstituted data is printed. Upon pressing a save key 1032, reconstituted data is saved in the local disk. A cancel key 1033 cancels reconstitution itself so that the display returns to FIG. 8.

Figure 10:
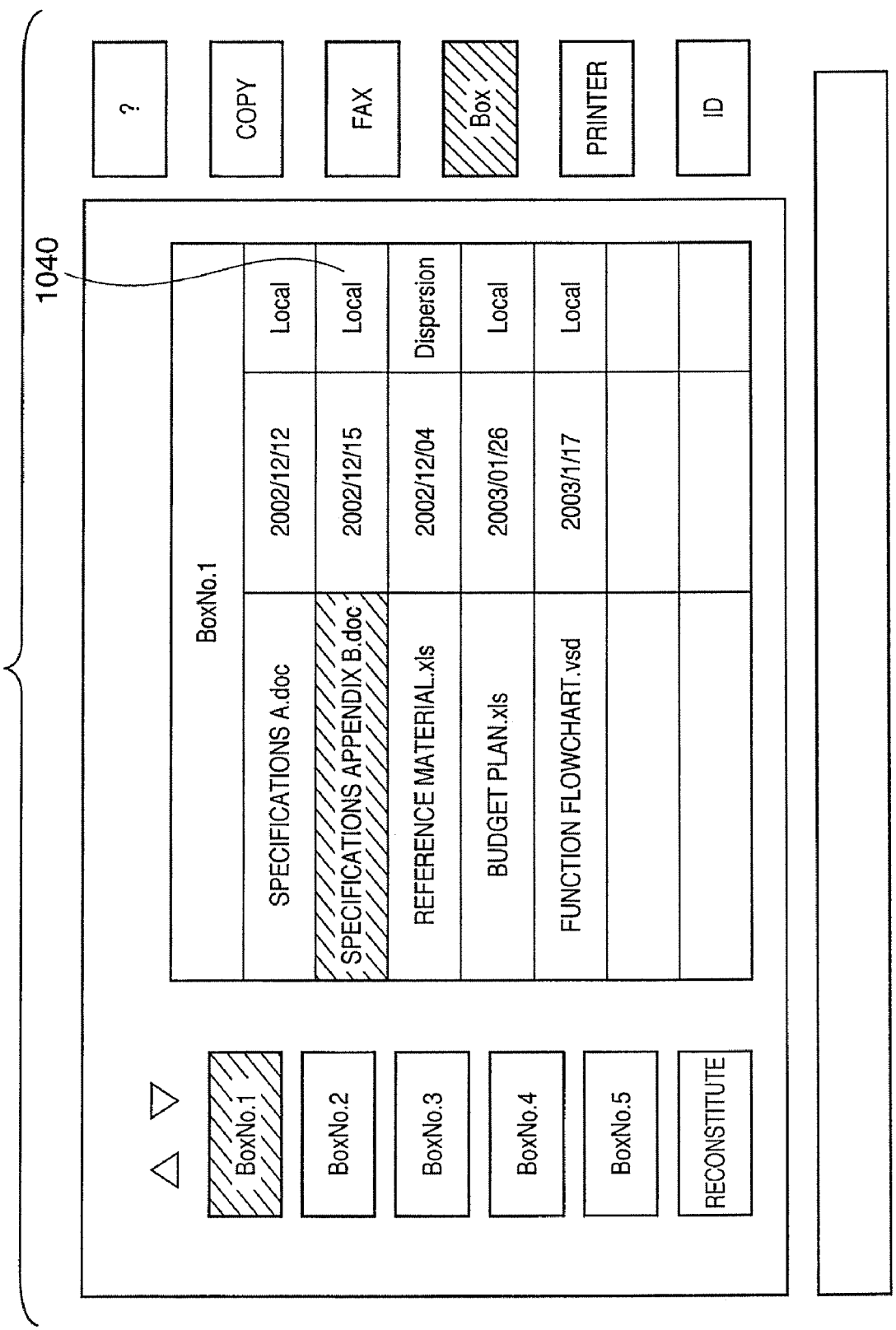
FIG. 10 is a view showing an example of a window that displays a processing result when a save key is pressed.

FIG. 10 is a view showing an example of display on the operation unit 173 when the save key 1032 is pressed in the display example shown in FIG. 9. As is apparent from FIG. 10, the image data storage location changes from "Dispersion" to "Local", as indicated by 1040.

(Data Reconstitution Processing)

Reconstitution processing of distributedly stored data according to this embodiment will be described below in detail.

Figure 11:
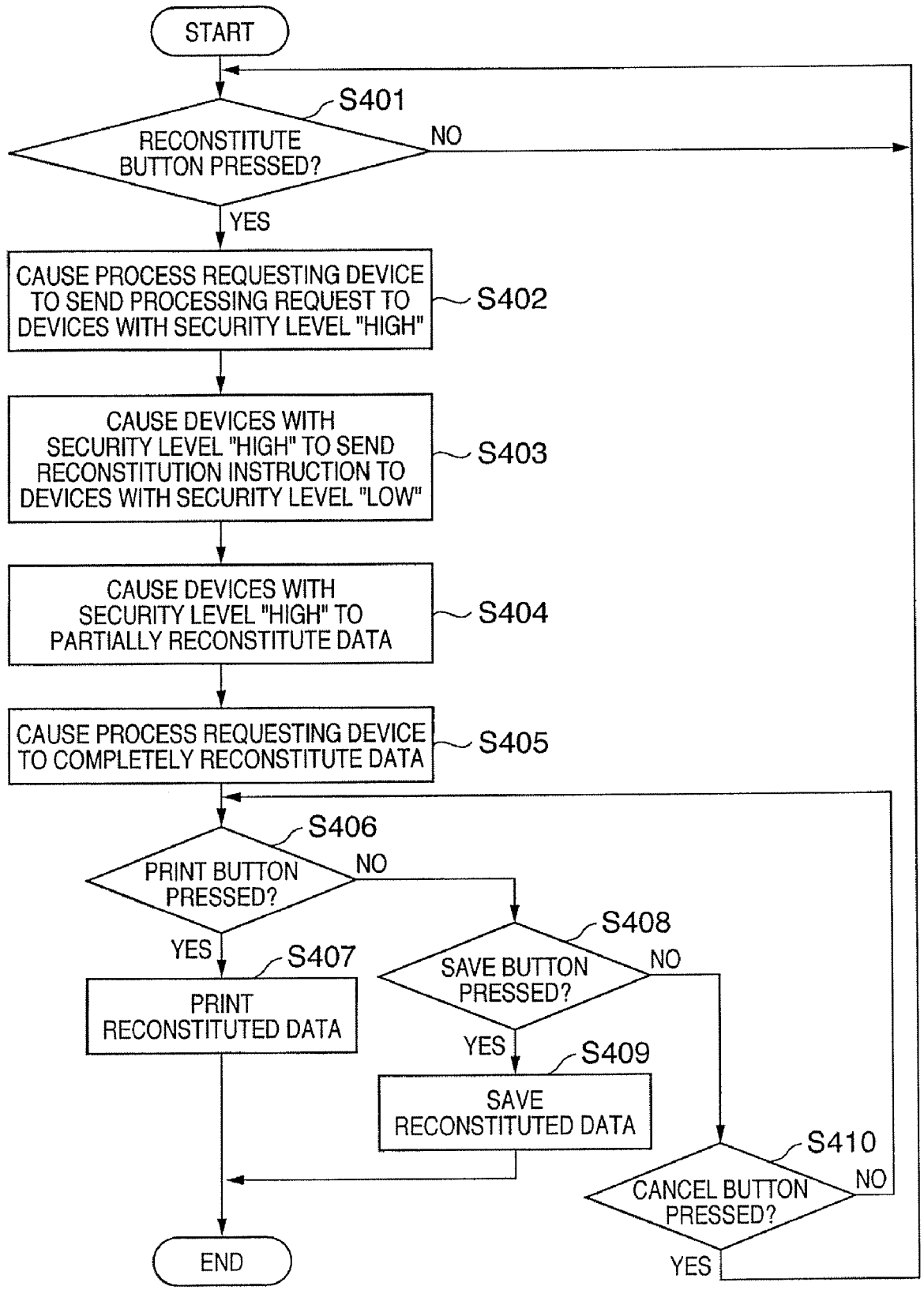
FIG. 11 is a flowchart showing data reconstitution processing according to the embodiment.

FIG. 11 is a flowchart of data reconstitution. First, in step S401, it is determined whether the reconstitute key 1020 shown in FIG. 8 is pressed. In step S402, the process requesting device 60 requests the devices 62 with security level "high" to do reconstitution processing. The process requesting device 60 executes this request by using information (network address or device ID) which is held in distributedly storing image data as a reconstitution processing target and represents a device that is holding the distributedly stored image data as the reconstitution processing target. In step S403, upon receiving the reconstitution processing request, the devices 62 with security level "high" instruct the devices 63 with security level "low" which actually distributedly store the image data 211 to reconstitute the data. The devices 62 with security level "high" execute this request by using information (network addresses or device IDs) representing the devices 63 with security level "low" which are holding the distributedly stored image data as the reconstitution processing target. The devices 62 with security level "high" hold this information (network addresses or device IDs) in distributedly storing image data as a reconstitution processing target. In step S404, the devices 62 with security level "high" collect the image data distributedly stored in the devices 63 with security level "low" and partially reconstitute the data to the image data 212 to 215 shown in FIG. 6C. In step S405, the process requesting device 60 completely reconstitutes the image data to the image data 210 shown in FIG. 6A.

When complete reconstitution of data ends, it is determined in step S406 whether the print key 1031 is pressed. If YES in step S406, the completely reconstituted image data 210 is printed in step S407. If NO in step S406, it is determined in step S408 whether the save key 1032 is pressed. If YES in step S408, the image data 210 is saved in the local disk in step S409. If NO in step S408, it is determined in step S410 whether the cancel key 1033 is pressed. If NO in step S410, the step returns to step S406. If YES in step S410, the step returns to step S401 to cancel the reconstitution processing itself and discard the image data 210.

For the processing in steps S405 to S410, it is also effective to select one of the print key 1031, save key 1032, and cancel key 1033 before complete reconstitution of data. In this case, at the timing of pressing the print key 1031 or save key 1032, complete reconstitution processing is executed, and image data is printed or saved. Pressing the cancel key 1033 inhibits complete reconstitution processing so that the security can further improve.

As described above, according to this embodiment, in reconstituting image data distributedly stored in a plurality of devices, a device with security level "high" executes partial reconstitution, and then, a process requesting device executes complete reconstitution. This enables high-speed processing while keeping a high security level.

In this embodiment, the security has two levels. However, the number of security levels is not limited to two. This embodiment is also applicable to a system with three, four, or more security levels. That is, data distributedly stored in devices with a certain security level undergoes partial reconstitution and complete reconstitution by devices with a higher security level. Alternatively, data partially reconstituted by devices with a certain security level undergoes complete reconstitution by a device with a higher security level. In this case, the security level of the process requesting device is higher than that of the device used for partial reconstitution.

In this embodiment, an example has been described in which the devices 63 with security level "low" distributedly store image data. However, the distributed storage location is not limited to this. For example, the devices 62 with security level "high" or process requesting device 60 may partially distributedly store image data.

Second Embodiment

The second embodiment of the present invention will be described below in detail. In the second embodiment, a plurality of devices distributedly process a large quantity of image data.

The second embodiment also uses copying machines, PCs, and servers, as in the above-described first embodiment. Their hardware configurations are the same as in FIGS. 2 and 3 of the first embodiment, and a description thereof will be omitted. The basic window of the operation unit of a copying machine is also the same as in FIG. 7 of the first embodiment, and a description thereof will be omitted. Note that each arrangement here is merely an example, and the present invention is not limited to the illustrate arrangements.

Figure 12:
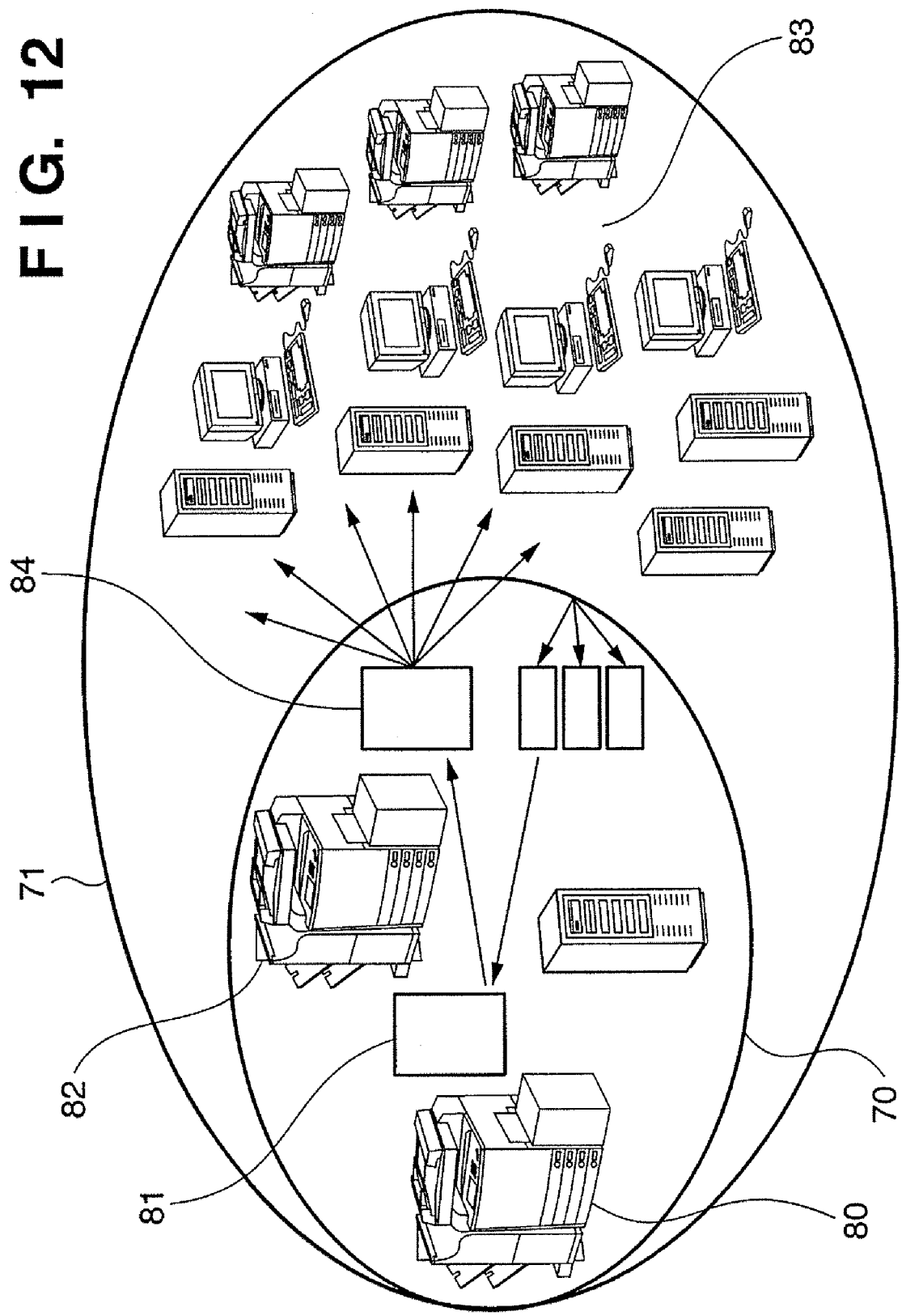
FIG. 12 is a view showing an example of a system environment according to the second embodiment.

FIG. 12 is a conceptual diagram showing an example of an environment where at least one device is categorized in each of a plurality of groups with different security levels. An example of such an environment is a network environment. Referring to FIG. 12, for example, a group 70 may be an intranet environment, and a group 71 may be an Internet environment. The group 70 may be a network environment used by, e.g., the personnel department in an intranet, and the group 71 is a network environment used by other departments. Alternatively, the group 70 may be an office environment in an intranet, and the group 71 may be a laboratory environment. Such grouping can freely be done in accordance with the security level. The group 71 may be set as devices registered in the grid computing network of an Internet environment. A description of grid computing will be omitted because it has been done in the first embodiment.

The second embodiment will be described by exemplifying grouping to define that the group 70 is an office environment in an intranet, and the group 71 is a laboratory environment.

A process requesting device 80 and devices 82 with security level "high" are categorized in the group 70. Copying machines and servers are installed as the process requesting device 80 and devices 82. Image data 81 is original data as a processing target. Devices 83 with security level "low" are categorized in the group 71. Copying machines, PCs, servers, and the like are installed as the devices 83.

In the second embodiment, the installation location of a device (a user who can use the device) decides the security level "high" or "low", as in the first embodiment. That is, the security level is irrelevant to the arrangement (function) of a device.

In the second embodiment, an example will be described wherein a large quantity of image data 81 as a processing target is distributedly processed. More specifically, the devices 82 with security level "high" fragment the original image data 81 to an insignificant level (unrecognizable level because of a small data amount) to generate data 84. A request is issued to the devices 83 with security level "low" to distributedly process the fragmented data 84. When the devices 83 with security level "low" end the distributed image processing, the devices 82 with security level "high" temporarily collect the processed data. Then, the process requesting device 80 completely collects the data.

(Outline of Data Fragmentation/Collection Processing)

Data fragmentation/collection processing according to the second embodiment will be described below with reference to FIGS. 13A to 13C.

Figure 13A:
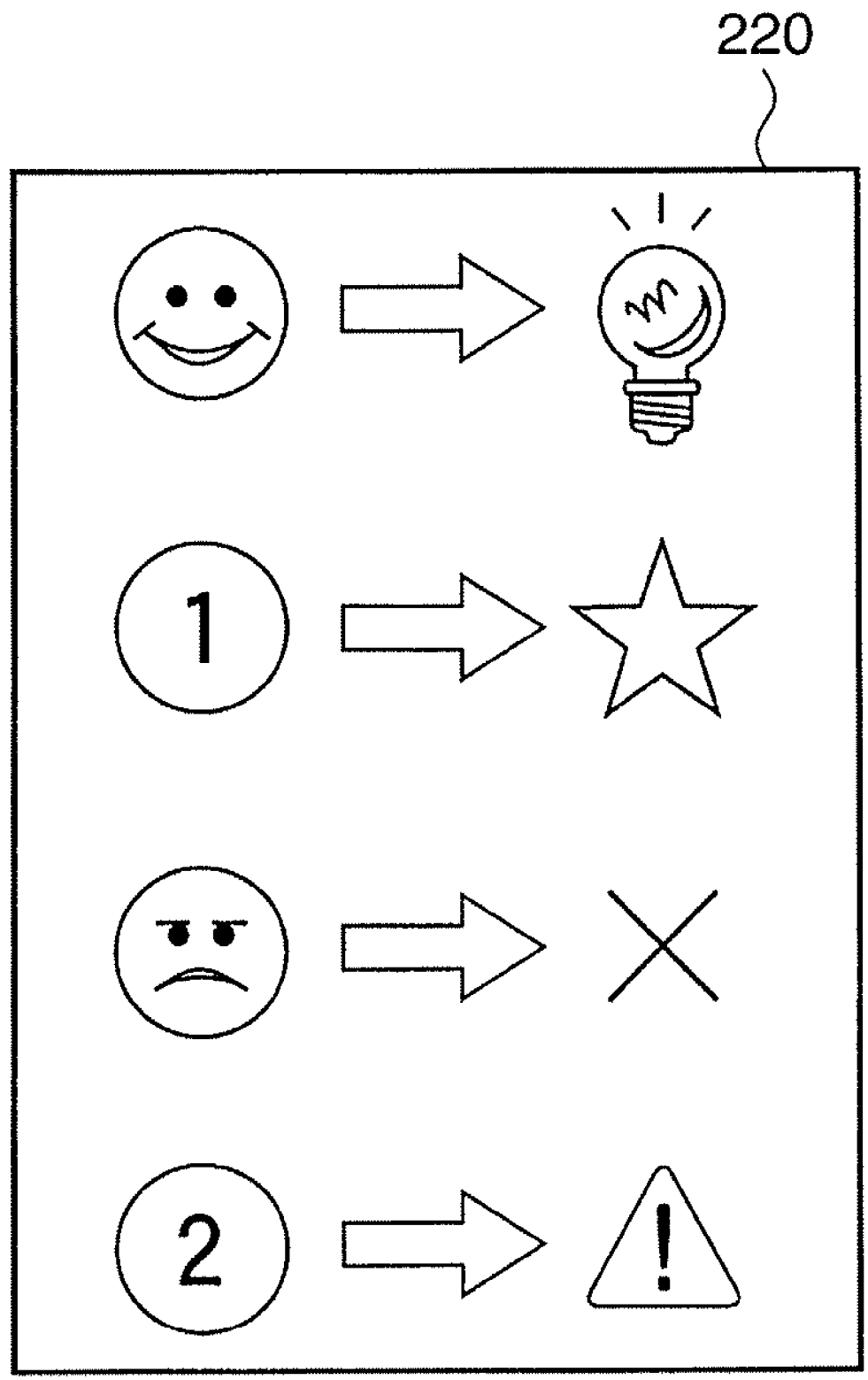
FIG. 13A is a view showing an example of original data as a processing target.
Figure 13B:
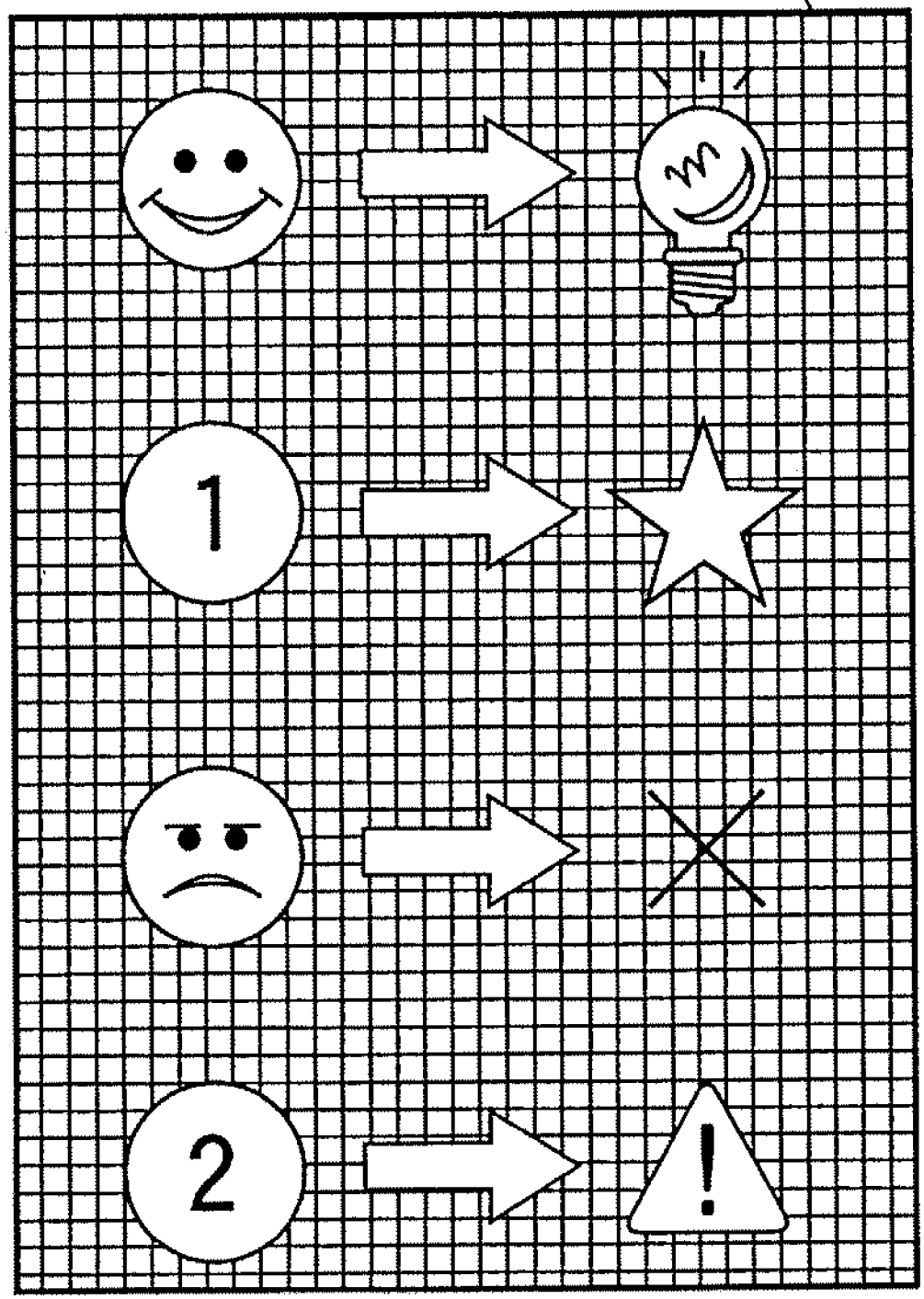
FIG. 13B is a view showing an example of data obtained by fragmenting the original data.

Image data 220 in FIG. 13A is an example of the image data 81 in FIG. 12 containing several objects. That is, the image data 220 indicates the significances of the objects, like a ciphertext.

The process requesting device 80 requests the devices 82 with security level "high" to execute processing. The devices 82 fragment the image data 220 to image data 221 shown in FIG. 13B to allow the devices 83 with security level "low" to process the data. That is, the devices 82 fragment the original image data 220 to a level that makes it unrecognizable as image data like a ciphertext. The fragment unit of the image data 221 is not particularly limited and may be, e.g., byte or word.

After fragmenting the image data 220, the devices 82 with security level "high" request the devices 83 with security level "low" to process the image data. The devices 83 with security level "low" execute requested image processing of the data. Examples of image processing are image format conversion, rendering, and compression processing. When the devices 83 with security level "low" finish the image processing, the devices 82 with security level "high" temporarily collect the processed data.

Figure 13C:
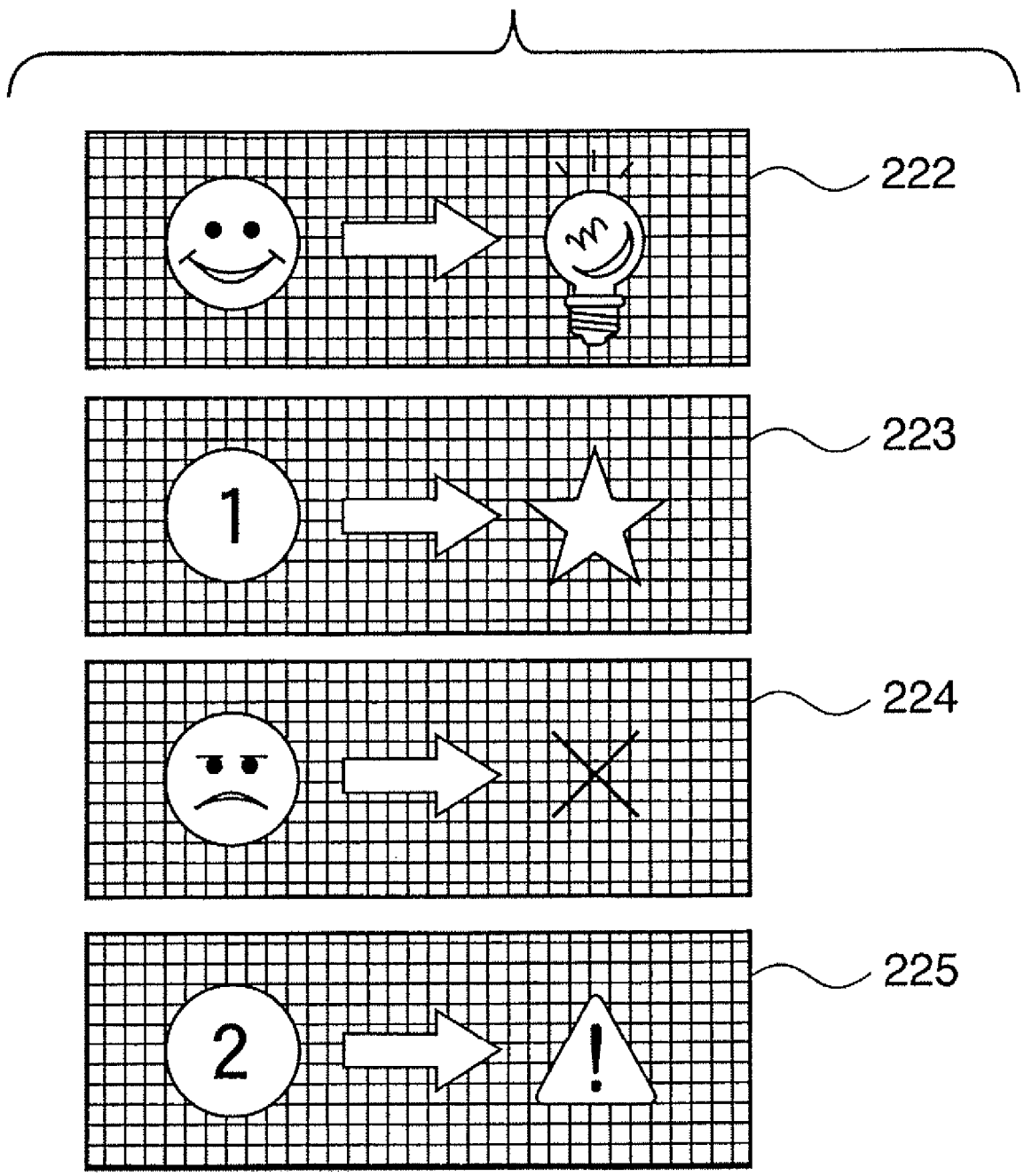
FIG. 13C is a view showing an example of data obtained by temporarily collecting the fragmented data.

FIG. 13C shows data temporarily collected by the devices 82 with security level "high". Image data 222 to 225 are temporarily collected to a level that makes the contents of the image data recognizable. That is, it is partially recognizable that the original image data 220 is like a ciphertext. It is important to cause the devices 82 with security level "high" which are categorized to the office environment to execute the temporary collection. At this time, the process requesting device 80 may execute whole processing. However, since this poses a problem of performance, it is more effective to cause the devices 82 with security level "high" to execute the temporary collection processing.

After the devices 82 with security level "high" temporarily collect the processed data, the process requesting device 80 executes complete collection. Actually, the large quantity of image data 81 containing, e.g., 100 pages or 1,000 pages or more is fragmented, and a request is issued to the devices 83 with security level "low" to distributedly process the image data.

(Distributed Processing Operation Window)

An operation unit 173 of the copying machine according to the second embodiment displays the basic window shown in FIG. 7, as in the first embodiment.

Figure 14:
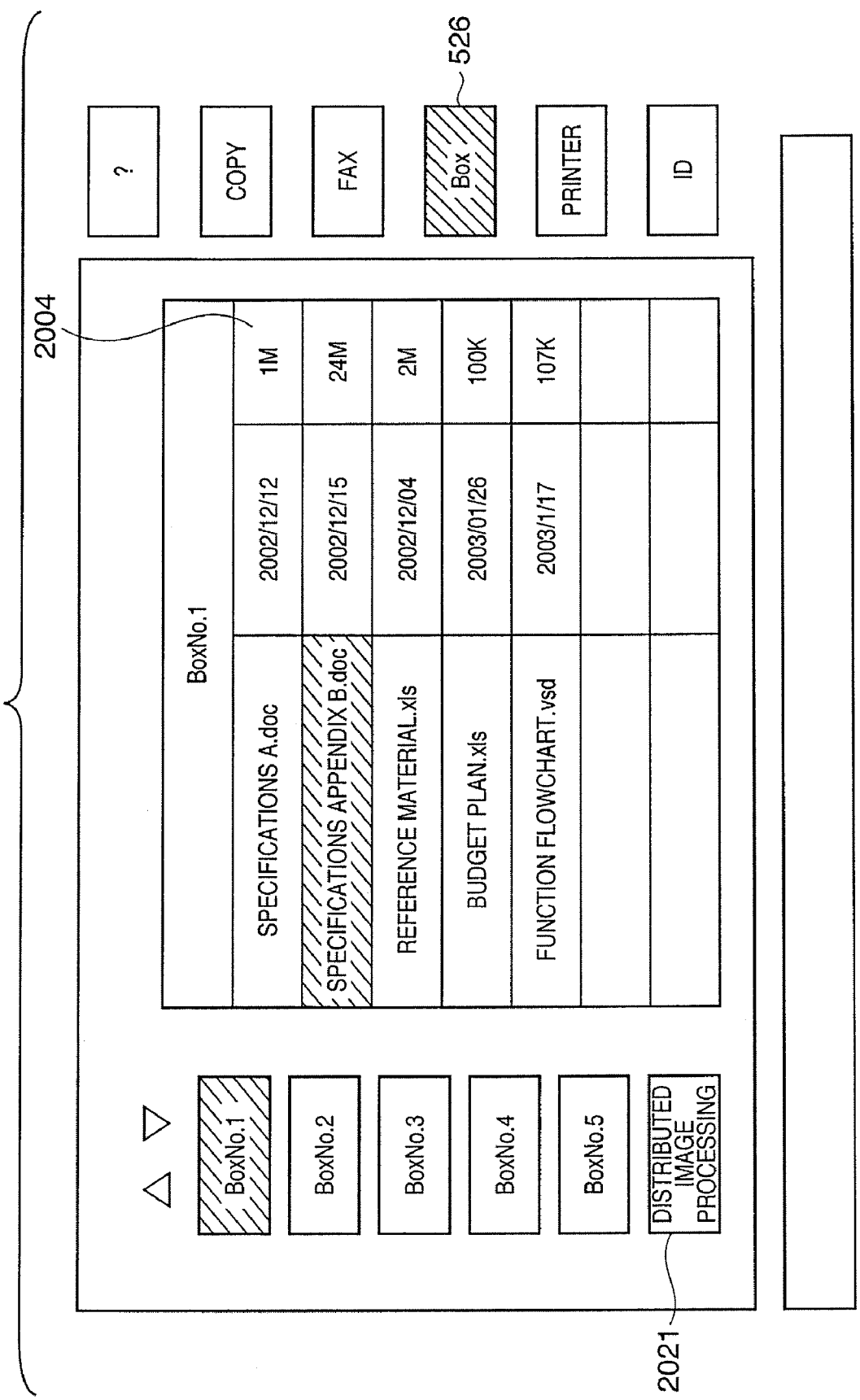
FIG. 14 is a view showing an example of a window displayed when a Box key is pressed.

FIG. 14 is a view showing an example of a window displayed when a Box key 526 in FIG. 7 is pressed. As a characteristic feature of the second embodiment, pressing the Box key 526 allows to process image data stored in a Box area. A Box area is ensured in the local disk (hard disk 162 in FIG. 2).

Many parts in FIG. 14 are the same as in the window shown in FIG. 8 of the above-described first embodiment, and only parts different from FIG. 8 will particularly be described below.

Referring to FIG. 14, a field 2004 displays the size information of each image data stored in a Box area. A distributed image processing key 2021 issues a distributed image processing request to the devices 82 with security level "high". Pressing the distributed image processing key 2021 displays a window shown in FIG. 15.

Figure 15:
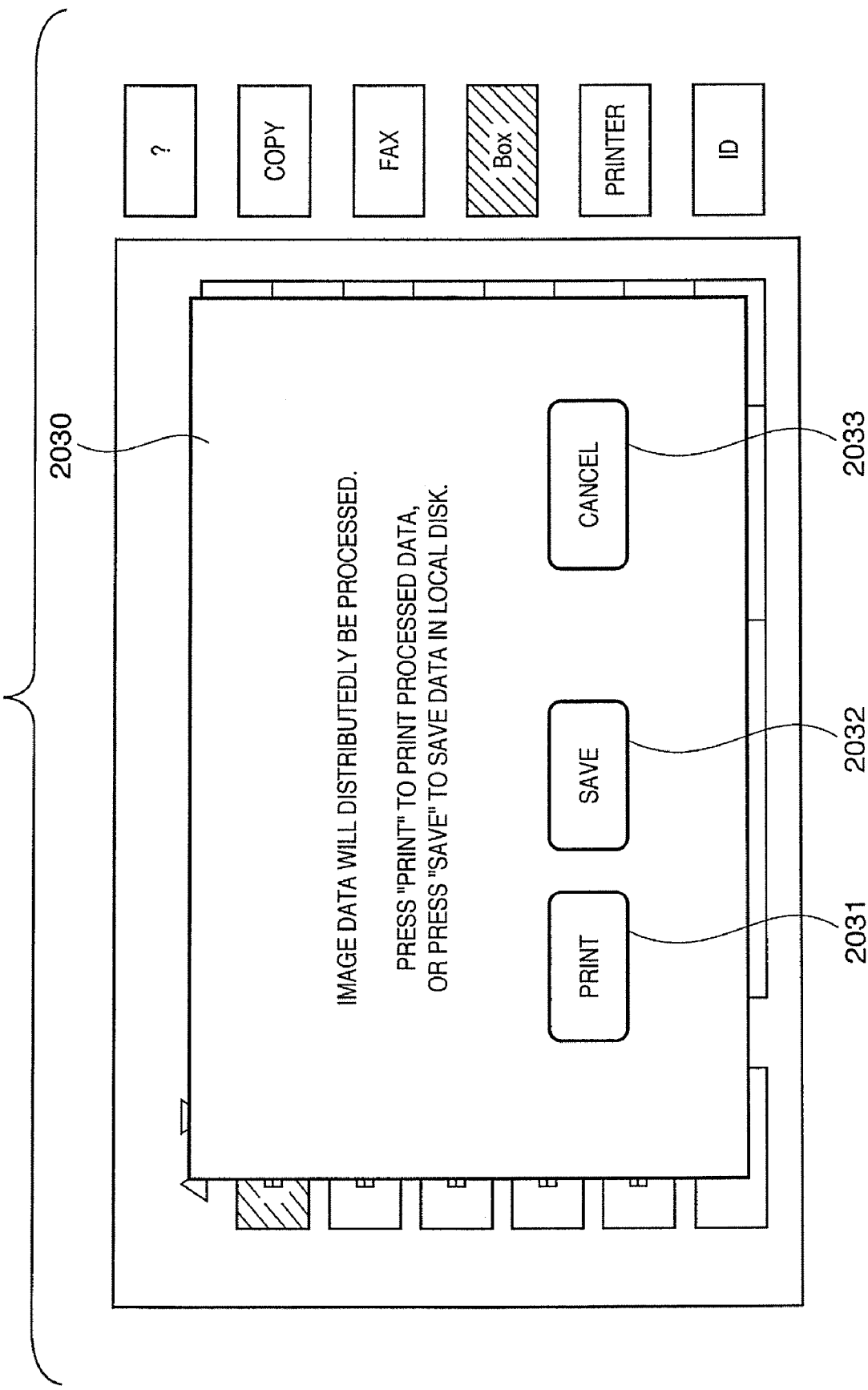
FIG. 15 is a view showing an example of a window displayed when a distributed image processing key is pressed.

FIG. 15 is a view showing an example of display on the operation unit 173 when the distributed image processing key 2021 in FIG. 14 is pressed. Display 2030 promotes the user to select print or save of distributedly processed image data. Upon pressing a print key 2031, collected data is printed. Upon pressing a save key 2032, collected data is saved in the local disk. A cancel key 2033 cancels collection itself so that the display returns to FIG. 14.

Figure 16:
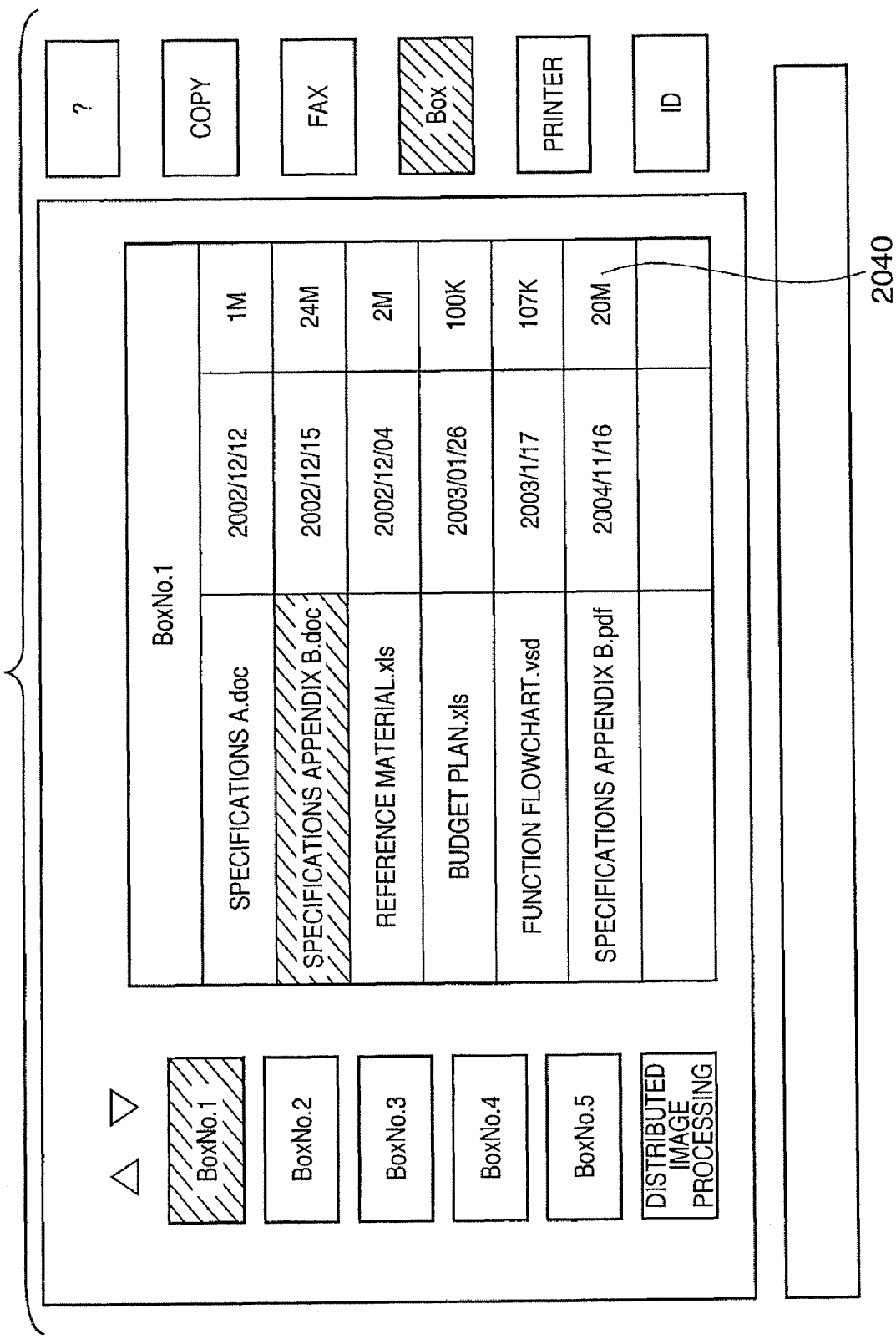
FIG. 16 is a view showing an example of a window that displays a processing result when a save key is pressed.

FIG. 16 is a view showing an example of display on the operation unit 173 when the save key 2032 is pressed in the display example shown in FIG. 15. As is apparent from FIG. 16, data that has undergone image processing (conversion to a PDF file in this embodiment) is newly stored in a Box area, as indicated by 2040.

(Distributed Image Processing)

Figure 17:
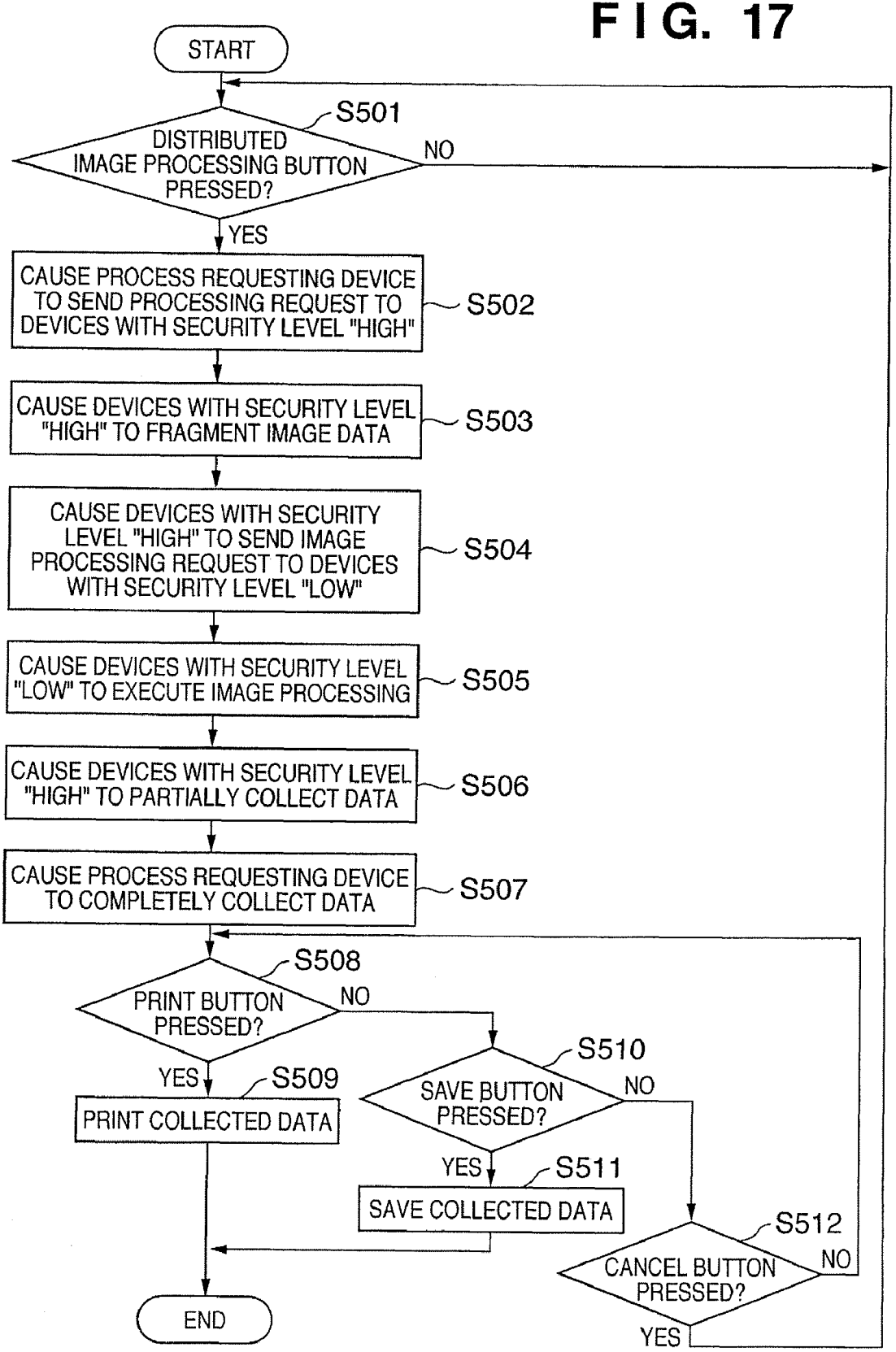
FIG. 17 is a flowchart showing distributed image processing according to the second embodiment.

Distributed image processing according to the second embodiment will be described below in detail with reference to the flowchart in FIG. 17.

First, in step S501, it is determined whether the distributed image processing key 2021 shown in FIG. 14 is pressed. In step S502, the process requesting device 80 requests the devices 82 with security level "high" to do image processing. In step S503, upon receiving the distributed image processing request, the devices 82 with security level "high" fragment the image data and, in step S504, request the devices 83 with security level "low" to execute image processing. In step S505, each of the devices 83 with security level "low" processes the fragmented image data. When the image processing ends, in step S506, the devices 82 with security level "high" temporarily collect the image data processed by the devices 83 with security level "low" as the image data 222 to 225 shown in FIG. 13C. In step S507, the process requesting device 80 completely connects the image data as the image data 220 shown in FIG. 13A.

When complete collection of data ends, it is determined in step S508 whether the print key 2031 is pressed. If YES in step S508, the completely collected image data 220 is printed in step S509. If NO in step S508, it is determined in step S510 whether the save key 2032 is pressed. If YES in step S510, the image data 220 is saved in the local disk in step S511. If NO in step S510, it is determined in step S512 whether the cancel key 2033 is pressed. If NO in step S512, the step returns to step S508. If YES in step S512, the step returns to step S501 to cancel the distributed image processing itself and discard the image data 220.

For the processing in steps S507 to S512, it is also effective to select one of the print key 2031, save key 2032, and cancel key 2033 before distributed image processing. In this case, at the timing of pressing the print key 2031 or save key 2032, distributed image processing and collection processing of processed data are executed, and image data is printed or saved. Pressing the cancel key 2033 inhibits distributed image processing and collection processing of processed data so that the processing efficiency can increase.

As described above, according to the second embodiment, devices with security level "high" fragment data to be processed and execute distributed image processing. At this time, devices with security level "low" that the process requesting device does not recognize are also usable. This enables more complex processing at a higher speed while keeping a high security level. The devices with security level "high" temporarily collect data to collect and reconstitute the image processing result. This allows to distribute load on the process requesting device and prevent any decrease in performance while ensuring a high security level.

Third Embodiment

The third embodiment of the present invention will be described below in detail. In the third embodiment, a large quantity of arithmetic data is distributedly processed.

The third embodiment also uses copying machines, PCs, and servers, as in the above-described first and second embodiments. Their hardware configurations are the same as in FIGS. 2 and 3 of the first embodiment, and a description thereof will be omitted. Note that each arrangement here is merely an example, and the present invention is not limited to the illustrate arrangements.

Figure 18:
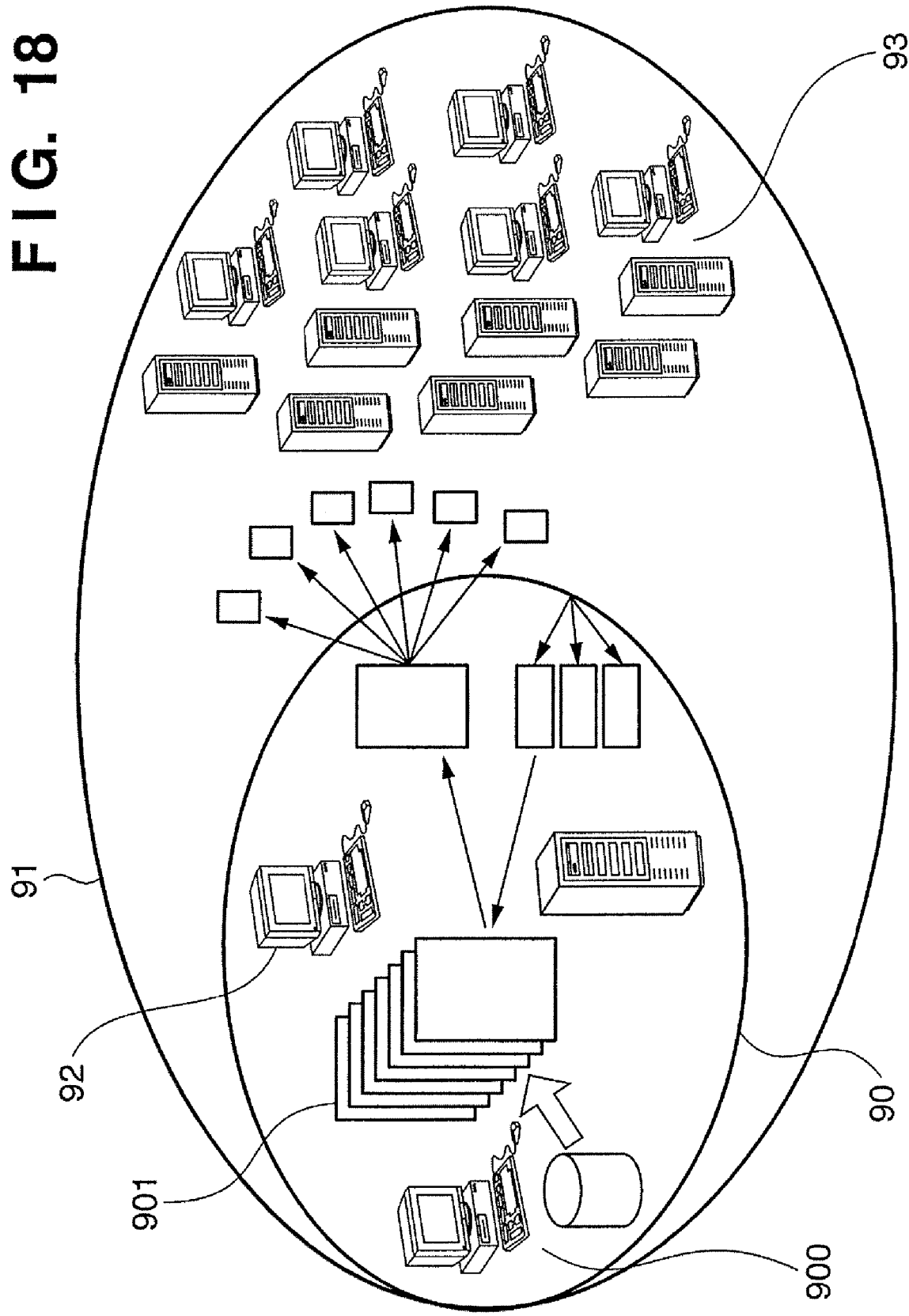
FIG. 18 is a view showing an example of a system environment according to the third embodiment.

FIG. 18 is a conceptual diagram showing an example of an environment where at least one device is categorized in each of a plurality of groups with different security levels. An example of such an environment is a network environment. Referring to FIG. 18, for example, a group 90 may be an intranet environment, and a group 91 may be an Internet environment. The group 90 may be a network environment used by, e.g., the personnel department in an intranet, and the group 91 is a network environment used by other departments. Alternatively, the group 90 may be an office environment in an intranet, and the group 91 may be a laboratory environment. Such grouping can freely be done in accordance with the security level. The group 91 may be set as devices registered in the grid computing network of an Internet environment. A description of grid computing will be omitted because it has been done in the first embodiment.

The third embodiment will be described by exemplifying grouping to define that the group 90 is an office environment in an intranet, and the group 91 is a laboratory environment.

A process requesting device 900 and devices 92 with security level "high" are categorized in the group 90. A PC is installed as the process requesting device 900. PCs and servers are installed as the devices 92. Devices 93 with security level "low" are categorized in the group 91. PCs, servers, and the like are installed as the devices 93.

In the third embodiment, the installation location of a device (a user who can use the device) decides the security level "high" or "low", as in the first embodiment. That is, the security level is irrelevant to the arrangement (function) of a device.

In the third embodiment, when, e.g., executing large-scale arithmetic processing of a large quantity of operation data 901 read out from a database, a request is issued to the devices 92 with security level "high" to do the large-scale arithmetic processing as distributed processing. More specifically, the devices 92 with security level "high" fragment the large quantity of operation data 901 to an insignificant (unrecognizable) level. A request is issued to the devices 93 with security level "low" to execute distributed arithmetic processing. When the devices 93 with security level "low" end the arithmetic processing, the devices 92 with security level "high" temporarily collect the processed data. Then, the process requesting device 900 completely collects the data.

(Outline of Data Fragmentation/Collection Processing)

Data fragmentation/collection processing according to the third embodiment will be described below with reference to FIGS. 19A to 19C.

Figure 19A:
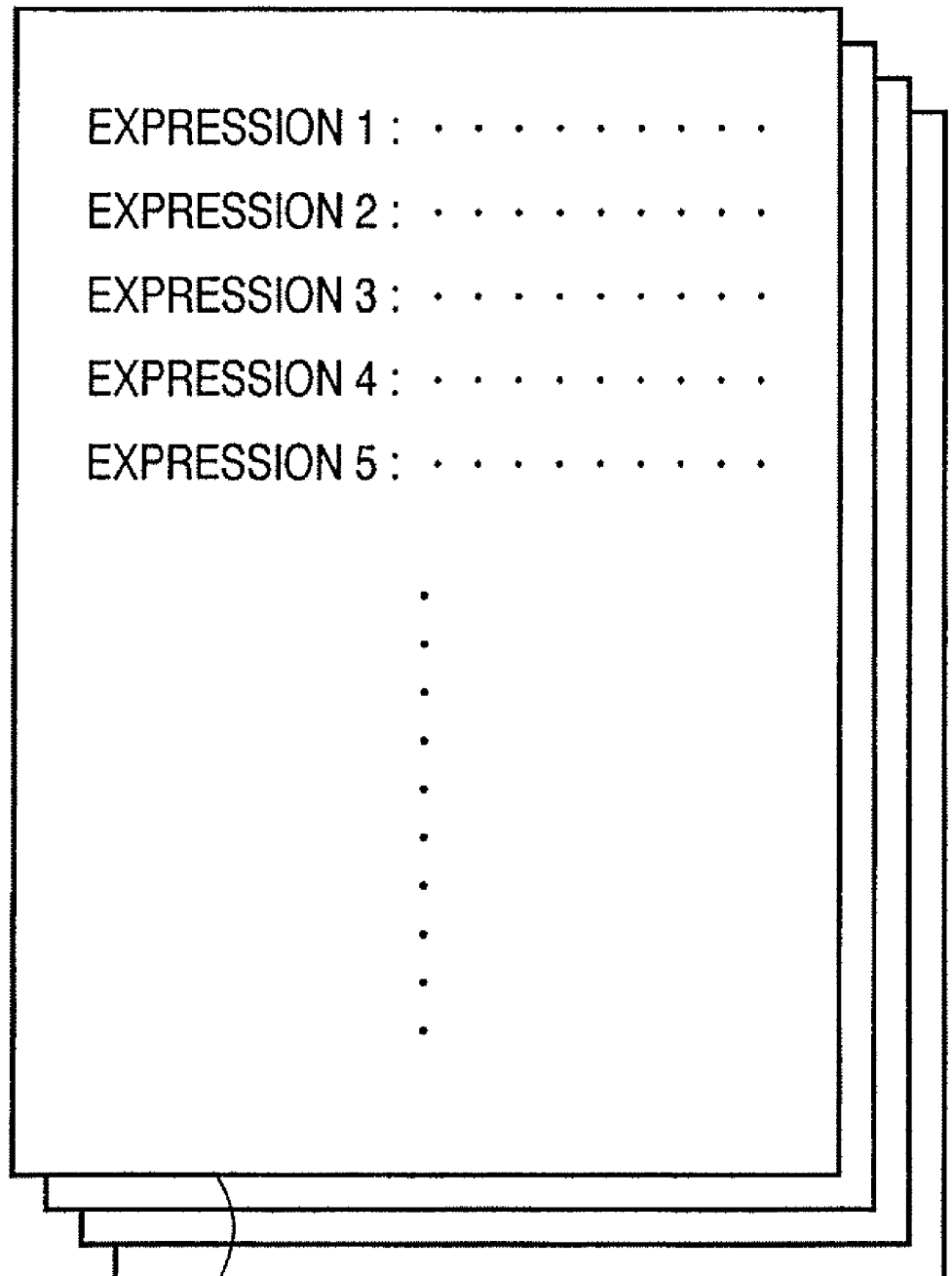
FIG. 19A is a view showing an example of original data as a processing target.

Operation data 320 in FIG. 19A is an example of the operation data 901 in FIG. 18 containing a number of operations to be processed. FIG. 19B shows operation data 321 obtained by fragmenting the operation data 901. FIG. 19C shows temporarily collected operation data 322 to 325.

The process requesting device 900 requests the devices 92 with security level "Thigh" to execute arithmetic processing. The devices 92 fragment the operation data 901 to the operation data 321 shown in FIG. 19B to allow the devices 93 with security level "low" to process the data.

After fragmenting the operation data 901, the devices 92 with security level "high" request the devices 93 with security level "low" to execute arithmetic processing. The devices 93 with security level "low" execute requested arithmetic processing. When the devices 93 with security level "low" finish the arithmetic processing, the devices 92 with security level "high" temporarily collect the processed data.

Figure 19C:
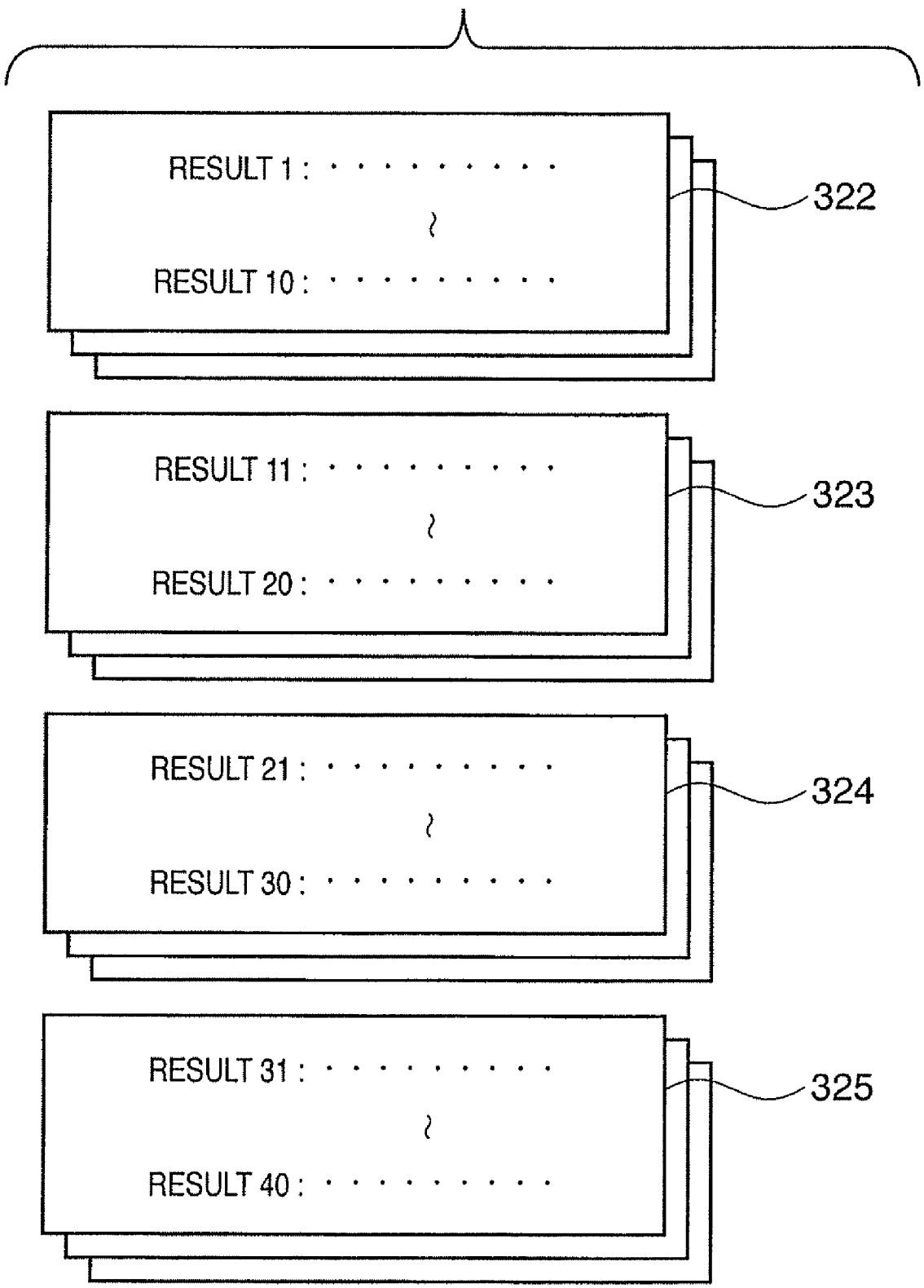
FIG. 19C is a view showing an example of data obtained by temporarily collecting the fragmented data.

FIG. 19C shows data temporarily collected by the devices 92 with security level "high". The result data 322 to 325 are temporarily collected to a level that makes the contents of the data recognizable. It is important to cause the devices 92 with security level "high" which are categorized to the office environment to execute the temporary collection. At this time, the process requesting device 900 may execute whole processing. However, since this poses a problem of performance, it is more effective to cause the devices 92 with security level "high" to execute the temporary collection processing.

After the devices 92 with security level "high" temporarily collect the result data, the process requesting device 900 executes complete collection.

(Distributed Processing Operation Window)

Figure 20:
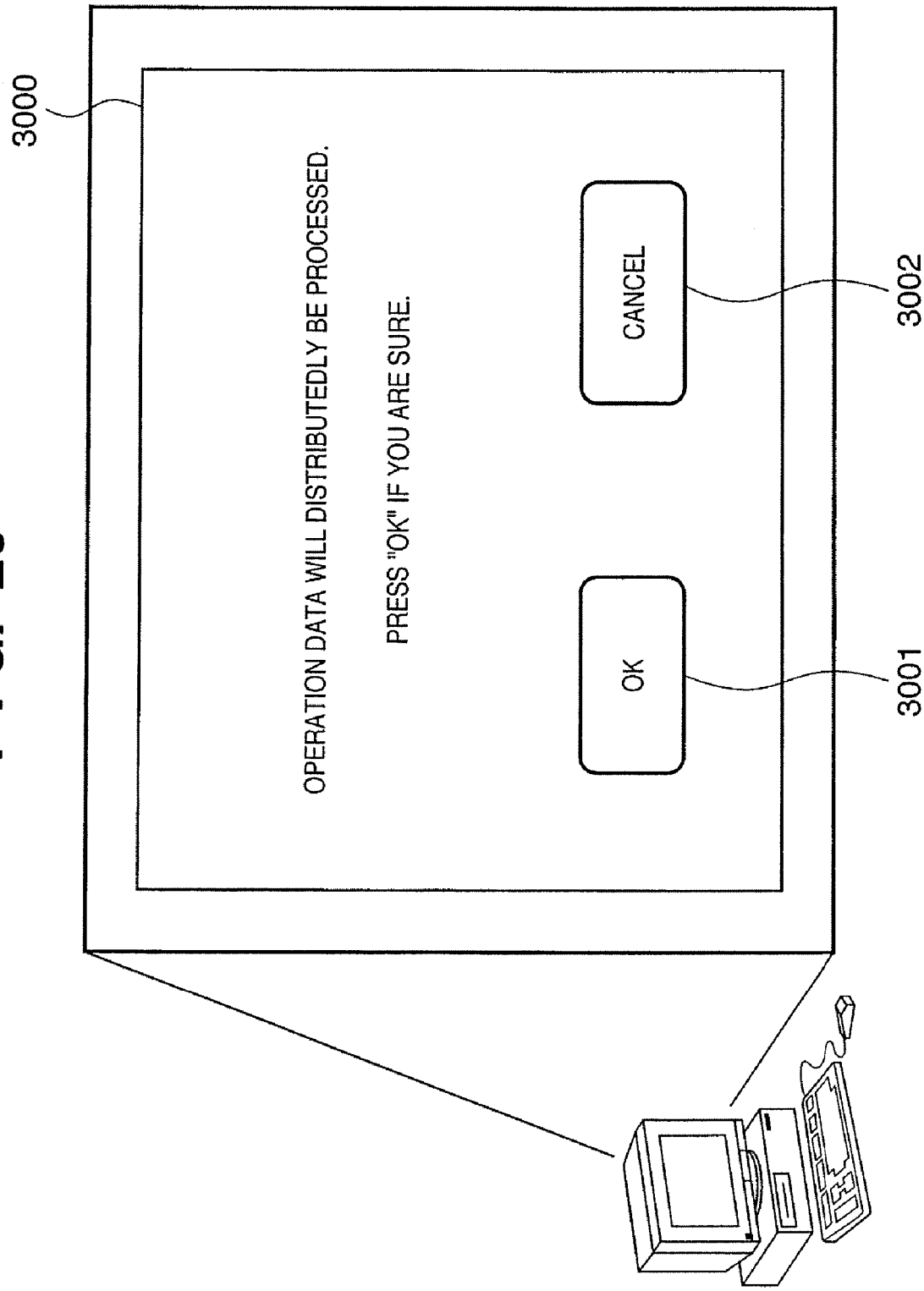
FIG. 20 is a view showing an example of a window displayed when arithmetic processing is executed as distributed processing.

FIG. 20 is a view showing an example of a window displayed on a liquid crystal display 4203 of an operation unit 171 when the process requesting device 900 executes arithmetic processing. Display 3000 promotes the user to select whether to execute distributed arithmetic processing. An OK key 3001 starts distributed processing. A cancel key 3002 cancels processing.

Figure 21:
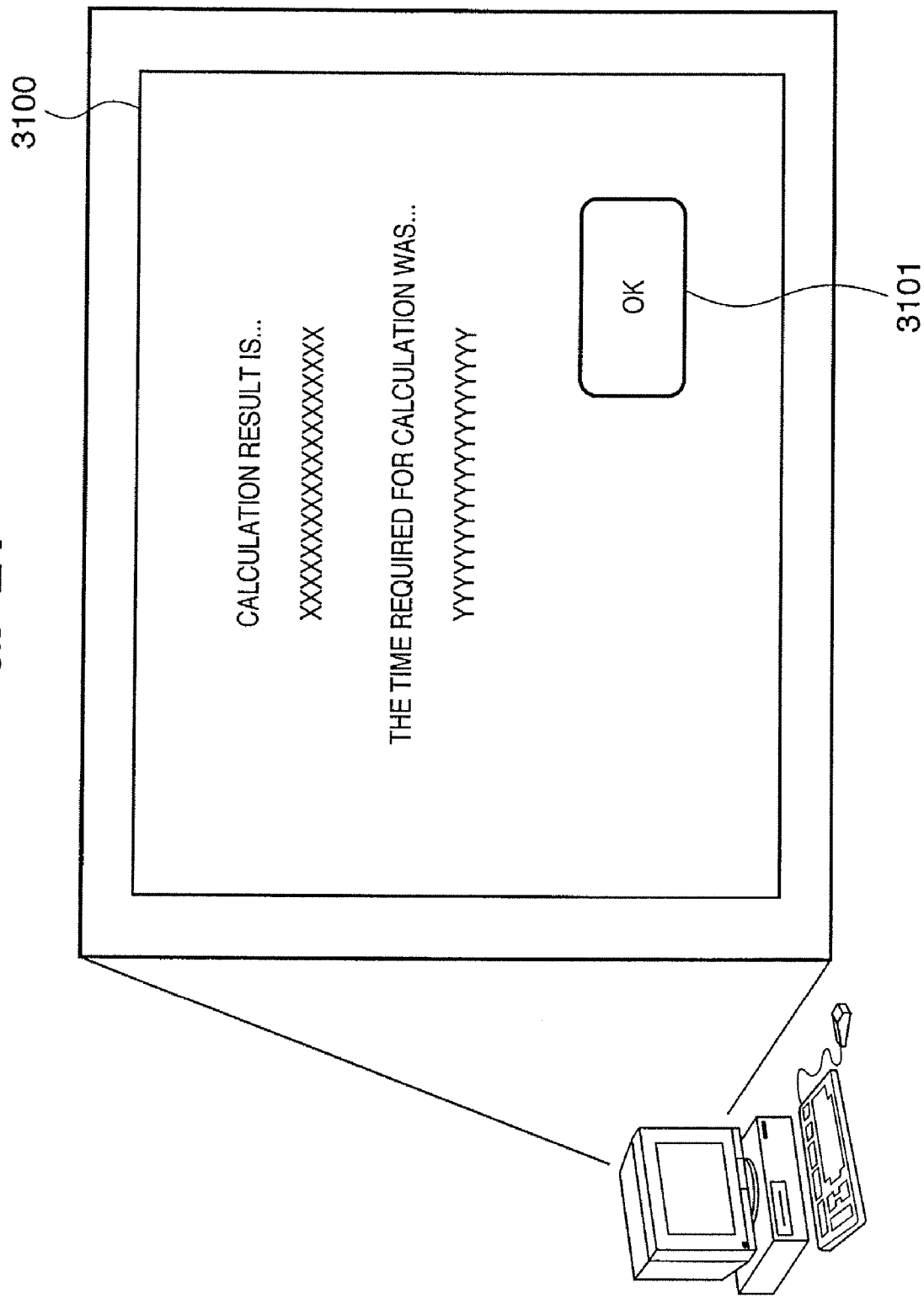
FIG. 21 is a view showing an example of a window that displays a distributed processing result.

When arithmetic processing distributed by pressing the OK key 3001 ends, the liquid crystal display 4203 displays the result as in FIG. 21. Referring to FIG. 21, display 3100 indicates the arithmetic processing result and the time required for the arithmetic processing. The user confirms the result by an OK button 3101.

(Distributed Arithmetic Processing)

Figure 22:
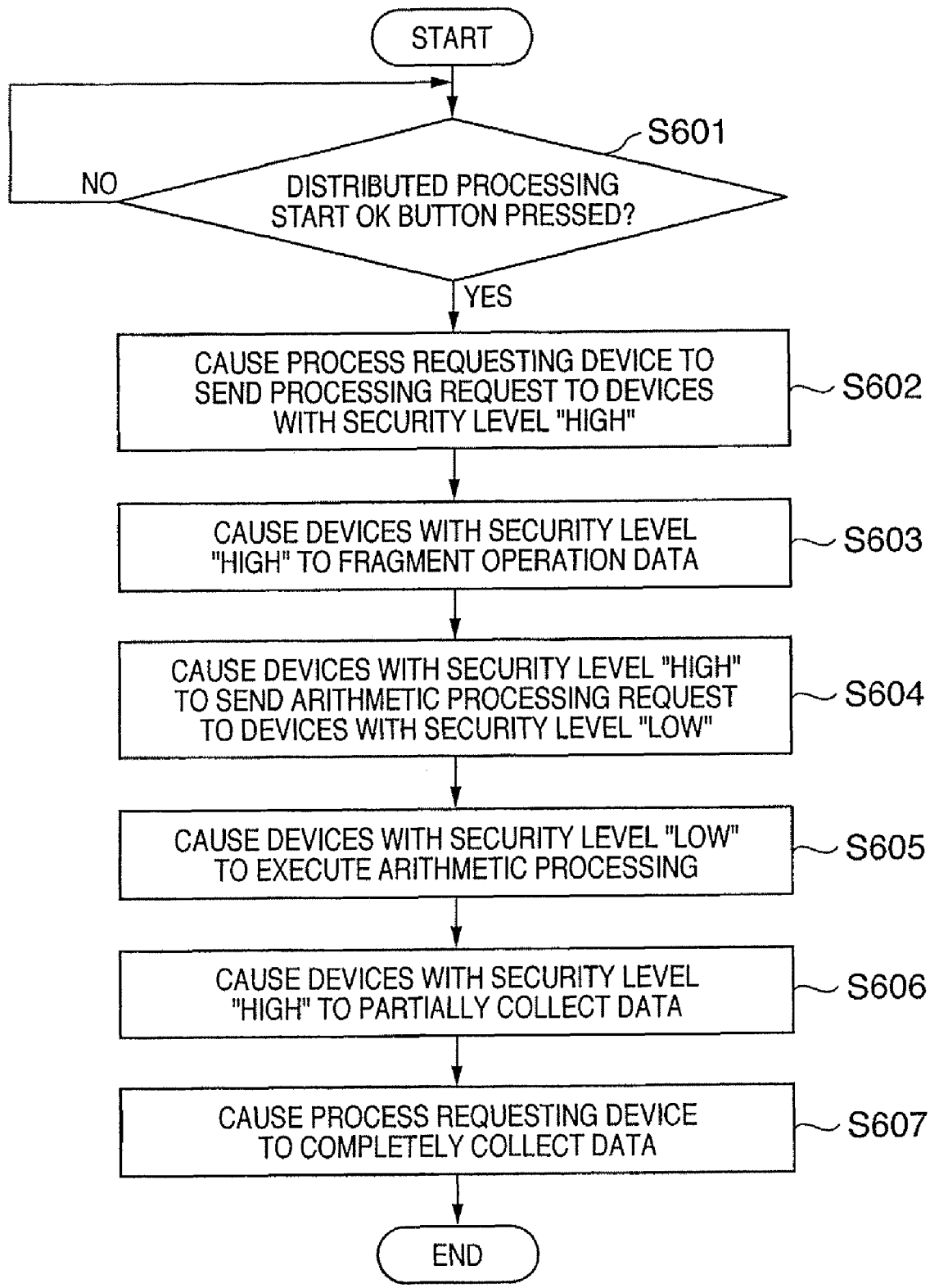
FIG. 22 is a flowchart showing distributed arithmetic processing according to the third embodiment.

Distributed arithmetic processing according to the third embodiment will be described below in detail with reference to the flowchart in FIG. 22.

First, in step S601, it is determined whether the OK key 3001 in FIG. 20 to start distributed arithmetic processing is pressed. In step S602, the process requesting device 900 requests the devices 92 with security level "high" to do arithmetic processing. In step S603, upon receiving the arithmetic processing request, the devices 92 with security level "high" fragment the operation data and, in step S604, request the devices 93 with security level "low" to execute arithmetic processing. In step S605, each of the devices 93 with security level "low" executes arithmetic processing based on the fragmented operation data. When the arithmetic processing ends, in step S606, the devices 62 with security level "high" temporarily collect the result data processed by the devices 93 with security level "low" as the result data 322 to 325 shown in FIG. 19C. In step S607, the process requesting device 900 completely connects the result data as the operation data 320 shown in FIG. 19A.

As described above, according to the third embodiment, devices with security level "high" fragment data to be processed and execute distributed arithmetic processing. At this time, devices with security level "low" that the process requesting device does not recognize are also usable. This enables more complex processing at a higher speed while keeping a high security level. The devices with security level "high" temporarily collect data to collect the calculation results. This allows to distribute load on the process requesting device and prevent any decrease in performance while ensuring a high security level.

Even in the second and third embodiments, the security has two levels, as in the first embodiment. However, the number of security levels is not limited to two. The embodiments are also applicable to a system with more security levels.

In the second and third embodiments, the devices with security level "low" are requested to do data processing. However, the processing request destination is not limited to this. For example, the devices with security level "Thigh" or process requesting device can also partially process data.

Fourth Embodiment

The fourth embodiment of the present invention will be described below in detail. Even the fourth embodiment reconstitutes distributedly stored data, as in the first embodiment. A distributed storage method will particularly be described here in detail. The arrangements shown in FIGS. 1 to 7, 9 and 10 of the above-described first embodiment are common to the fourth embodiment, and a description thereof will be omitted. Note that each arrangement here is merely an example, and the present invention is not limited to these arrangements.

(Distributed Processing Operation Window)

An operation unit 173 of a copying machine according to the fourth embodiment displays the basic window shown in FIG. 7, as in the first embodiment.

Figure 23:
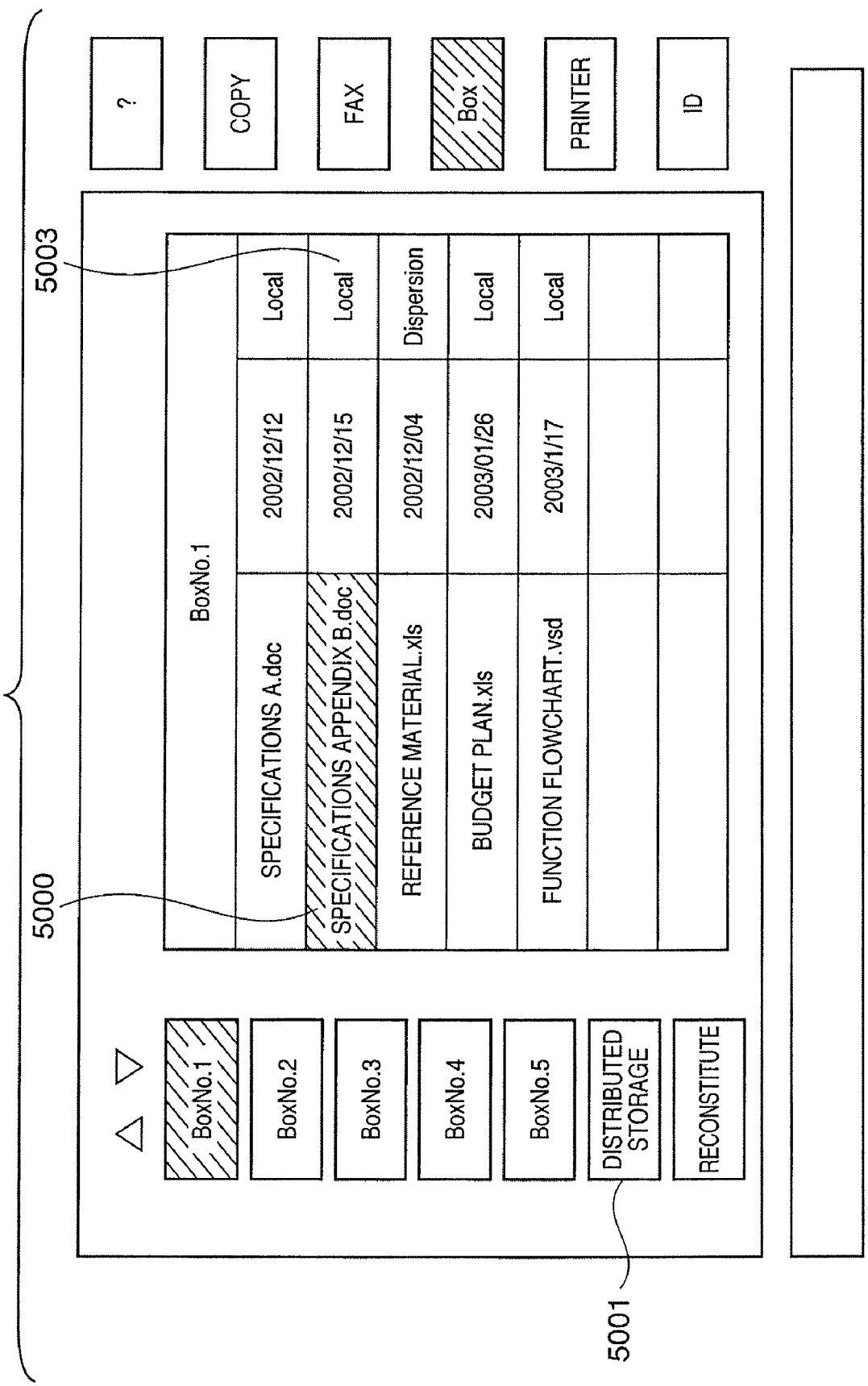
FIG. 23 is a view showing an example of a window displayed when a Box key is pressed in the fourth embodiment.

FIG. 23 is a view showing an example of a window displayed when a Box key 526 in FIG. 7 is pressed. As a characteristic feature, a distributed storage key 5001 is added to the window example shown in FIG. 8 of the first embodiment. Pressing the distributed storage key 5001 allows to distributedly store image data already stored in the local disk. It is also possible to input new image data by, e.g., scan and distributedly store it.

For example, when the user selects image data 5000 stored in a Box area and presses the distributed storage key 5001, the image data 5000 is distributedly stored. When the user places a document on the scanner and presses the distributed storage key 5001 without selecting image data, the document on the scanner is read and distributedly stored. When distributed storage starts, devices 62 with security level "high" fragment image data, as shown in FIG. 6B. Devices 63 with security level "low" distributedly store the image data. Then, the image data storage location changes from "Local" to "Dispersion", as indicated by 5004 in FIG. 24. Pressing a reconstitute key 5002 enables data reconstitution, as described in the first embodiment.

(Distributed Storage Processing)

Distributed storage processing according to the fourth embodiment will be described below in detail with reference to the flowchart in FIG. 25.

First, in step S701, it is determined whether the distributed storage key 5001 shown in FIG. 23 is pressed. In step S702, a process requesting device 60 requests the devices 62 with security level "high" to do distributed storage processing. In step S703, upon receiving the distributed image processing request, the devices 62 with security level "high" fragment the image data and, in step S704, request the devices 63 with security level "low" to execute storage processing. In step S705, each of the devices 63 with security level "low" stores the fragmented image data.

Image data reconstitution is the same as in the above-described first embodiment.

As described above, according to the fourth embodiment, devices with security level "high" fragment data to be processed and execute distributed storage processing. At this time, devices with security level "low" that the process requesting device does not recognize are also usable. This enables more complex processing at a higher speed while keeping a high security level.

Even in the fourth embodiment, the security has two levels, as in the first embodiment. However, the number of security levels is not limited to two. The embodiments are also applicable to a system with more security levels.

In the fourth embodiment, the devices with security level "low" are requested to do distributed storage. However, the distributed storage destination is not limited to this. For example, the devices with security level "high" or process requesting device can also partially store data.

In the second to fourth embodiments, the process requesting device or a device with security level "high" holds a network address or device ID as the information of a device that distributedly stores image data, as in the first embodiment. The process requesting device or the device with security level "high" collects the distributed image data by using the information of the device that distributedly stores image data.

Other Embodiment

The embodiments have been described above in detail. The present invention can also have an embodiment of a system, apparatus, method, program, or storage medium (recording medium). More specifically, the present invention is applicable to a system including a plurality of devices or an apparatus including a single device.

The present invention is also achieved by supplying a software program to implement the functions of the above-described embodiments to the system or apparatus directly or from a remote site and causing the computer of the system or apparatus to read out and execute the supplied program codes. In this case, the program corresponds to the illustrated flowcharts of the embodiments.

Hence, the program codes themselves which are installed in a computer to implement the functional processing of the present invention also implement the present invention. That is, the present invention also incorporates the computer program itself to implement its functional processing.

In this case, the program can take any form such as an object code, a program to be executed by an interpreter, or script data to be supplied to the OS as long as the functions of the program are available.

Examples of a recording medium to supply the program are a Floppy® disk, hard disk, optical disk (CD of DVD), magnetooptical disk (MO), magnetic tape, nonvolatile memory card, and semiconductor ROM.

The following program supply method is also available. A client computer may connect to a homepage on the Internet via a browser to download the computer program itself of the present invention (or a compressed file containing an automatic installation function) from the homepage to a recording medium such as a hard disk. The program codes contained in the program of the present invention may be divided into a plurality of files so that the user can download the files from different homepages. That is, a WWW server which causes a plurality of users to download the program file to implement the functional processing of the present invention is also incorporated in the present invention.

The program of the present invention may be encrypted, stored in a storage medium such as a CD-ROM, and distributed to users. Any user who satisfies predetermined conditions can download key information to decrypt the program from a homepage through the Internet. The user can execute the encrypted program by using the key information and install the program in the computer.

The functions of the above-described embodiments are implemented when the computer executes the readout program. The functions of the above-described embodiments are also implemented when, e.g., the OS running on the computer partially or wholly executes actual processing on the basis of the instructions of the program.

The functions of the above-described embodiments are also implemented when the program read out from the recording medium is written in the memory of a function expansion board inserted into the computer or a function expansion unit connected to the computer and executed. That is, the CPU of the function expansion board or function expansion unit can partially or wholly execute actual processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-311809, filed Oct. 26, 2005, which is hereby incorporated by reference herein in its entirety.

What is claimed is:

1. In a distributed storage and processing system in which object data are each divided into fragments which are distributedly stored in the system, and which has a plurality of device groups which have different security levels, including at least a first device group, a second device group containing at least two devices, and a third device group, the third device group having a lower security level than the first and second device groups, a first device, which is in the first device group, said first device comprising:
    a displaying unit which lists the object data that have each been divided into fragments which are distributedly stored in the devices in the third device group;
    a selecting unit which allows a user to select an object datum listed by said displaying unit for reconstitution of the selected object datum;
    an instructing unit which instructs each of the at least two devices in the second device group to reconstitute intermediate data constituting a part of the object datum selected by said selecting unit, causing each of the at least two devices in the second device group to collect the fragments of the selected object datum directly from devices in the third device group and reconstitute the intermediate data using the collected fragments of the selected object datum; and
    a collecting unit which collects the intermediate data constituting parts of the object datum selected by said selecting unit directly from the at least two devices in the second device group and reconstitutes the selected object datum using the collected intermediate data,
    wherein said displaying unit further displays, for an object datum which has been divided into fragments which are distributedly stored in the devices in the third device group, status information which indicates that the object datum is distributedly stored, and updates, when the object datum has been reconstituted, the status information to indicate that the restored object datum is stored in the first device.

2. The first device according to claim 1, wherein the first device group and the second device group have the same security level.

3. The first device according to claim 1, wherein the first device group comprises only said first device.

4. The first device according to claim 1, wherein devices that exist in an intranet are categorized in the first device group, and devices that exist in the Internet are categorized in the second device group.

5. The first device according to claim 1, wherein devices registered in a grid computing network in advance are set as the first device group and the second device group.

6. A distributed processing method for a first device, which is in a first device group included in a processing system which reconstitutes object data which are each divided into fragments which are distributedly stored in devices in the processing system, and includes a plurality of device groups, including the first device group, a second device group containing at least two devices, and a third device group, the third device group having a lower security level than the first and second device groups, said method comprising the steps of:
    displaying a list of the object data that have each been divided into fragments which are distributedly stored in devices in the third device group;
    selecting in accordance with a user instruction an object datum included in the list of the object data displayed in said displaying step;
    instructing each of the at least two devices in the second device group to reconstitute intermediate data that constitutes a part of the object datum selected in said selecting step, causing each of the at least two devices in the second device group to collect the fragments of the selected object datum directly from the devices in the third device group and to reconstitute the intermediate data using the collected fragments of the selected object datum; and collecting the intermediate data constituting parts of the object datum selected in said selecting step directly from each of the at least two devices in the second device group and reconstituting the selected object datum using the collected intermediate data, wherein said displaying step includes displaying, for an object datum which has been divided into fragments which are distributedly stored in the devices in the third device group, status information which indicates that the object datum is distributedly stored, and updates, when the object datum has been reconstituted, the status information to indicate that the restored object datum is stored in the first device.

7. The method according to claim 6, wherein the first device group and the second device group have the same security level.

8. The method according to claim 6, wherein the first device comprises only a single device.

9. The method according to claim 6, wherein devices that exist in an intranet are categorized in the first device group, and devices that exist in the Internet are categorized in the second device group.

10. The method according to claim 6, wherein devices registered in a grid computing network in advance are set as the first device group and the second device group.

11. A non-transitory computer-readable medium which stores a computer program implementing a control method for a first device, which is in a first device group included in a processing system which reconstitutes object data which are each divided into fragments which are distributedly stored in the processing system, and includes a plurality of device groups, including the first device group, a second device group containing at least two devices, and a third device group, the third device group having a lower security level than the first and second device groups, said method comprising:

displaying a list of the object data which have each been divided into fragments which are distributedly stored in devices in the third device group;

selecting in accordance with a user instruction an object datum included in the list of the object data displayed in said displaying step;

instructing each of the at least two devices in the second device group to reconstitute intermediate data that constitutes a part of the object datum selected in said selecting step, causing each of the at least two devices in the second device group to collect the fragments of the selected object datum directly from the devices in the third device group and to reconstitute the intermediate data using the collected fragments of the selected object datum; and collecting the intermediate data constituting parts of the object datum selected in said selecting step directly from each of the at least two devices in the second device group and reconstituting the selected object datum using the collected intermediate data, wherein said displaying step includes displaying, for an object datum which has been divided into fragments which are distributedly stored in the devices in the third device group, status information which indicates that the object datum is distributedly stored, and updates, when the object datum has been reconstituted, the status information to indicate that the restored object datum is stored in the first device.

12. The first device according to claim 1, further comprising:

a management unit which manages one or more object data including object data stored in the first device or object data which are divided into fragments which are distributedly stored in other devices;

a second displaying unit which displays a window for selecting an object datum managed by said management unit, by an operation of a user; and a determination unit which determines whether the object datum selected by said second displaying unit is stored in the first device or distributedly stored in other devices, wherein said instructing unit instructs, when said determination unit determines that the object datum selected by said second displaying unit is divided into fragments which are distributedly stored in other devices, the at least two devices in the second device group to reconstitute intermediate data constituting a part of the selected object datum, and said collecting unit collects the intermediate data from each of the at least two devices in the second device group and reconstitutes the object datum selected by said second displaying unit using the collected intermediate data.

13. The first device according to claim 12, wherein said second displaying unit further displays whether each of the object data is stored in the first device or distributedly stored in devices other than the first device.

14. A device comprising:

a storing unit which stores one or more object data;

a displaying unit which lists both the object data stored in said storing unit and the object data which are each divided into fragments which are distributedly stored in a plurality of external devices an instructing unit which selects an object datum displayed by said displaying unit as an instruction target, and a reconstituting unit which reconstitutes, when the object datum selected by said instructing unit divided into fragments which are distributedly stored in the plurality of external devices, the selected object datum by collecting intermediate fragments of the selected object datum from a plurality of second devices, wherein the intermediate fragments have been reconstituted by the plurality of second devices by collecting fragments of the selected object datum distributedly stored in the plurality of external devices, wherein said displaying unit further displays, for an object datum which has been divided into fragments which are distributedly stored in the plurality of external devices, status information which indicates that the object datum is distributedly stored, and updates, when the object datum has been reconstituted, the status information to indicate that the restored object datum is stored in the device by said storing unit.

* * * * *